US012558623B2

(12) United States Patent (10) Patent No.: US 12,558,623 B2
Huang et al. (45) Date of Patent: Feb. 24, 2026

(54) TASK GUIDANCE METHOD AND APPARATUS FOR HELPING A VIRTUAL CHARACTER IN VIRTUAL SCENE OF A GAME, ELECTRONIC DEVICE, STORAGE MEDIUM, AND PROGRAM PRODUCT

(71) Applicant: Tencent Technology (Shenzhen) Company Limited, Shenzhen (CN)

(72) Inventors: Manli Huang, Shenzhen (CN); Boyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 272 days.

(21) Appl. No.: 18/218,387

(22) Filed: Jul. 5, 2023

(65) Prior Publication Data

US 2023/0347243 A1 Nov. 2, 2023

Related U.S. Application Data

(63) Continuation of application No. PCT/CN2022/125059, filed on Oct. 13, 2022.

(30) Foreign Application Priority Data

Dec. 31, 2021 (CN) .......................... 202111662320.X

(51) Int. Cl.
*A63F 13/537* (2014.01)
*A63F 13/424* (2014.01)
(Continued)

(52) U.S. Cl.
CPC .......... *A63F 13/537* (2014.09); *A63F 13/424* (2014.09); *A63F 13/533* (2014.09); *A63F 13/5378* (2014.09); *A63F 2300/308* (2013.01)

(58) Field of Classification Search
None
See application file for complete search history.

(56) References Cited

U.S. PATENT DOCUMENTS

2012/0190452 A1* 7/2012 Weston ................. A63F 13/323
463/39
2020/0197812 A1 6/2020 Sensui
(Continued)

FOREIGN PATENT DOCUMENTS

CN 112843703 A 5/2021
CN 114247141 A 3/2022

OTHER PUBLICATIONS

Tencent Technology, ISR, PCT/CN2022/125059, Jan. 10, 2023, 2 pgs.
Tencent Technology, WO, PCT/CN2022/125059, Jan. 10, 2023, 5 pgs.

*Primary Examiner* — Lawrence S Galka
(74) *Attorney, Agent, or Firm* — Morgan, Lewis & Bockius LLP

(57) ABSTRACT

This application provides a task guidance method a virtual scene performed by an electronic device. The method includes: receiving an interaction guidance instruction for a non-user character associated with a virtual object, the interaction guidance instruction being used for indicating the non-user character to guide virtual tasks for the virtual object in a virtual scene; presenting task guidance information corresponding to the interaction progress of the virtual object in response to the interaction guidance instruction, the task guidance information being used for guiding the virtual object to perform at least one virtual task; and presenting guidance information for an interaction location corresponding to a target task in response to a confirmation instruction for the target task in the at least one virtual task based on the task guidance information.

20 Claims, 11 Drawing Sheets

(51) Int. Cl.
    *A63F 13/533*       (2014.01)
    *A63F 13/5378*     (2014.01)

(56)         References Cited

U.S. PATENT DOCUMENTS

2020/0330870 A1    10/2020   Sun
2021/0104100 A1     4/2021   Whitney et al.

\* cited by examiner

TASK GUIDANCE METHOD AND APPARATUS FOR HELPING A VIRTUAL CHARACTER IN VIRTUAL SCENE OF A GAME, ELECTRONIC DEVICE, STORAGE MEDIUM, AND PROGRAM PRODUCT

CROSS-REFERENCE TO RELATED APPLICATIONS

This application is a continuation application of PCT Patent Application No. PCT/CN2022/125059, entitled "TASK GUIDANCE METHOD AND APPARATUS IN VIRTUAL SCENE, ELECTRONIC DEVICE, STORAGE MEDIUM, AND PROGRAM PRODUCT" filed on Oct. 13, 2022, which is based on and claims the priority of (i) the Chinese patent application with the application number 202111662320.X, entitled "TASK GUIDANCE METHOD AND APPARATUS IN VIRTUAL SCENE, DEVICE, MEDIUM, AND PROGRAM PRODUCT" filed on Dec. 31, 2021 and (ii) the Chinese patent application with the application number 202111319975.7, entitled "TASK GUIDANCE METHOD AND APPARATUS IN VIRTUAL SCENE, DEVICE, MEDIUM, AND PROGRAM PRODUCT" filed on Nov. 9, 2021, all of which is incorporated herein by reference in its entirety.

FIELD OF THE TECHNOLOGY

This application relates to human-computer interaction technology, and in particular relates to a task guidance method and apparatus in a virtual scene, an electronic device, a computer readable storage medium, and a computer program product.

BACKGROUND OF THE DISCLOSURE

In virtual scene applications, when virtual objects feel lost during interaction in a virtual scene and do not know what virtual tasks to perform, they can seek guidance prompts from non-user characters. When guidance prompts are provided to users in the related art, all guidance information in the virtual scene is displayed for the users to choose from one by one. The users cannot easily locate the guidance information they need, resulting in a lack of interaction targets, low guidance efficiency and low user retention rate.

SUMMARY

The embodiments of this application provide a task guidance method and apparatus in a virtual scene, an electronic device, a non-transitory computer-readable storage medium, and a computer program product, which are capable of providing targeted virtual task guidance prompts for virtual objects, and further improving the efficiency of virtual task guidance.

The technical solutions of the embodiments of this application are implemented as follows:

An embodiment of this application provides a task guidance method in a virtual scene performed by an electronic device, the method including:

receiving an interaction guidance instruction for a non-user character associated with a virtual object in a virtual scene;

in response to the interaction guidance instruction, presenting task guidance information based on current interaction progress of the virtual object for guiding the virtual object to perform at least one virtual task; and in response to a confirmation instruction for a target task in the at least one virtual task based on the task guidance information, presenting guidance information for an interaction location corresponding to the target task.

An embodiment of this application provides an electronic device, including:

a memory, configured to store executable instructions; and a processor, configured to, when executing the executable instructions stored in the memory, cause the electronic device to implement the task guidance method in a virtual scene according to the embodiment of this application.

An embodiment of this application provides a non-transitory computer-readable storage medium storing executable instructions. The executable instructions are configured to, when executed by a processor of an electronic device, cause the electronic device to implement the task guidance method in a virtual scene according to the embodiment of this application.

The embodiments of this application have the following beneficial effects:

The embodiments of this application can provide a virtual object with guidance for virtual tasks in a virtual scene. When the virtual object is provided with guidance prompts, as the provided task guidance information corresponds to the interaction progress of the virtual object, that is, based on a player's current interaction progress, the virtual object can be provided with targeted guidance for virtual tasks corresponding to the current interaction progress, such that the player can quickly and conveniently locate the task guidance prompts he/she needs, greatly shortening a guidance path, improving the efficiency of virtual task guidance in a virtual scene and the hardware processing efficiency of devices, and increasing the user retention rate.

DESCRIPTION OF EMBODIMENTS

Figure 1A:
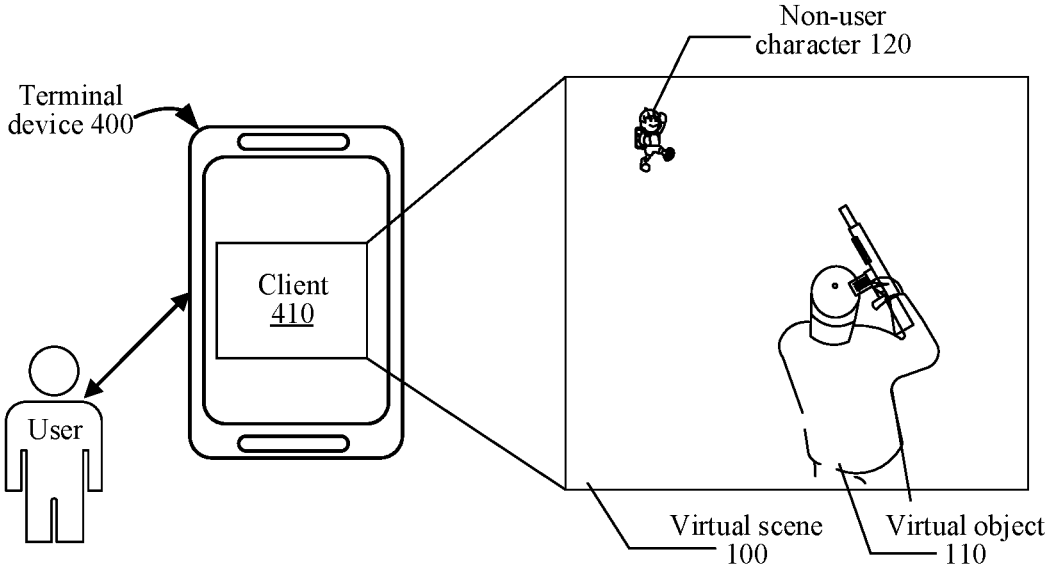
FIG. 1A is a schematic diagram of an application scenario of a task guidance method in a virtual scene according to an embodiment of this application.

In order to make the objectives, technical solutions, and advantages of this application clearer, this application will be described in detail in conjunction with the accompanying drawings. The described embodiments are not to be considered as limiting this application. All other embodiments obtained by an ordinary person skilled in the art without creative labor fall within the scope of protection of this application.

In the following description, the term "some embodiments" describes subsets of all possible embodiments. However, it may be understood that "some embodiments" may be the same or different subsets of all possible embodiments, and may be combined with each other without conflict.

In the following description, the term "first/second . . . " only distinguishes similar objects and does not represent a specific order for the objects. It may be understood that the term "first/second . . . " may be interchanged in a specific order or in a sequential order if allowed, so that the embodiments of this application described herein can be implemented in an order other than those illustrated or described herein.

Unless otherwise defined, meanings of all technical and scientific terms used in this specification are the same as those usually understood by a person skilled in the art to which this application belongs. The terms used herein are only for the purpose of describing the embodiments of this application and are not intended to limit this application.

Before the embodiments of this application are described in detail, the terms and phrases involved in the embodiments of this application are described. The following interpretations are applicable to the terms and phrases involved in the embodiments of this application.

1) Client: an application running in a terminal to provide various services, e.g., a video playback client and a game client.

2) In response to: this phrase is used for representing a condition or state on which a performed operation depends. When the dependent condition or state is met, one or more of the performed operations may be real-time or have a set delay. Unless otherwise specified, there is no restriction on the order of performance for multiple operations performed.

3) Virtual scene: a virtual scene displayed (or provided) by an application running on a terminal. The virtual scene may be a simulated environment of the real world, a semi-simulated and semifictional virtual environment, or a purely fictional virtual environment. A virtual scene may be any of two-dimensional, 2.5-dimensional, or three-dimensional virtual scenes, and the dimensions of the virtual scene are not limited in the embodiments of this application. For example, the virtual scene may include sky, land, ocean, etc. The land may include environmental elements such as deserts and cities, and users may control virtual objects to move in the virtual scene.

4) Virtual objects: various images of people and objects that may interact in a virtual scene, or movable objects in a virtual scene. The movable objects may be virtual characters, virtual animals, anime characters, etc., e.g., characters and animals displayed in a virtual scene. The virtual objects may be virtual images representing users in the virtual scene.

A virtual scene may include multiple virtual objects, each with its own shape and volume in the virtual scene, and occupying a portion of the space in the virtual scene.

5) Scene data: it represents feature data in a virtual scene, e.g., the location of a virtual object in a virtual scene, the waiting time for various functions configured in a virtual scene (depending on the number of times the same function can be used within a specific time), and the attribute values of various states of a game virtual object, e.g., hit points and mana points.

The embodiments of this application provide a task guidance method and apparatus in a virtual scene, an electronic device, a non-transitory computer-readable storage medium, and a computer program product, which are capable of providing targeted virtual task guidance prompts for virtual objects, and further improving the efficiency of virtual task guidance. To facilitate easier understanding of the task guidance method in a virtual scene according to this embodiment of this application, an exemplary implementation scenario is first described. The virtual scene according to the embodiments of this application may be outputted independently based on a terminal device or a server or outputted collaboratively based on a terminal device and a server.

In some embodiments, the virtual scene may be an environment for game characters to interact, for example, for game characters to engage in battles in the virtual scene. By controlling the actions of the game characters, both parties may interact in the virtual scene, allowing the users to relieve life pressure in the game process.

An implementation scenario is shown in FIG. 1A, which is a schematic diagram of an application scenario of the task guidance method in a virtual scene according to this embodiment of this application. In this application scenario, the task guidance method in a virtual scene according to this embodiment of this application is completely dependent on a terminal device. Computation of relevant data of a virtual scene 100 may be implemented by the computing capacity of graphics processing hardware of a terminal device 400. For example, in a single player/off-line mode game, a virtual scene may be outputted through various types of terminal devices 400, e.g., smartphones, tablets, and virtual reality/augmented reality devices. As an example, the graphics processing hardware includes Central Processing Units (CPUs) and Graphics Processing Units (GPUs).

When visual perception of the virtual scene 100 is formed, the terminal device 400 computes display data and implements loading, parsing and rendering of the display data by graphics computing hardware, and outputs video frames for forming the visual perception of the virtual scene by graphics output hardware. For example, two-dimensional video frames are presented on the display screen of a smartphone, or video frames for achieving three-dimensional display effects are projected on the lenses of a pair of augmented reality/virtual reality glasses. In addition, to increase the perception effects, the terminal device 400 may further utilize different hardware to form one or more auditory perception, tactile perception, motion perception, and taste perception.

As an example, a client 410 (e.g., a standalone game application) is run on the terminal device 400, and a virtual scene 100 including character-playing is outputted during the operation of the client 410. The virtual scene 100 may be an environment for game characters to interact, e.g., plains, streets, and valleys for the game characters to engage in battles. The virtual scene 100 includes a virtual object 110 and a non-user character 120. The virtual object 110 may be a game character controlled by a user (also called a player), that is, the virtual object 110 is controlled by a real user and will move in the virtual scene in response to the real user's operations on a controller (including a touch screen, a voice switch, a keyboard, a mouse, a joystick, etc.). For example, when the real user moves the joystick left, the virtual object 110 will move to the left in the virtual scene, and may also remain stationary, jump, or use various functions (e.g., skills and props). The non-user character 120 is an entity object associated with the virtual object 110 in the virtual scene, and may exist in the virtual scene at all times and follow the virtual object 110, or be presented in the virtual scene when called by the virtual object 110. The non-user character 120 is configured to provide guidance for virtual tasks for the virtual object 110 in the virtual scene, for example, guiding the virtual object 110 to perform virtual tasks corresponding to the current interaction progress.

As an example, the terminal receives an interaction guidance instruction for the non-user character associated with the virtual object; task guidance information corresponding to the interaction progress of the virtual object is presented in response to the interaction guidance instruction; the task guidance information is used for guiding the virtual object to perform at least one virtual task; and guidance information for an interaction location corresponding to a target task is presented in response to a confirmation instruction for the target task in the at least one virtual task based on the task guidance information. As the presented task guidance information corresponds to the current interaction progress of the virtual object, a more targeted virtual task is guided to be performed, and the guidance efficiency is improved.

Figure 1B:
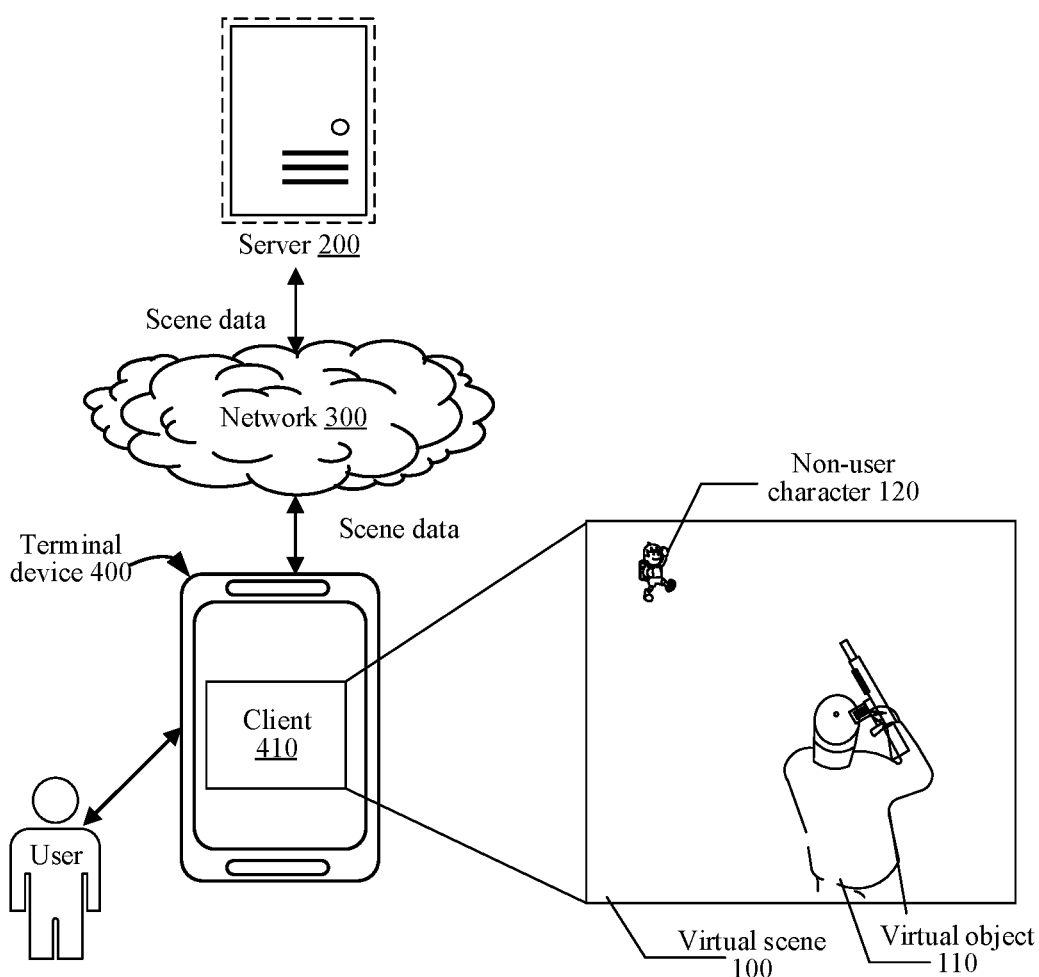
FIG. 1B is a schematic diagram of an application scenario of a task guidance method in a virtual scene according to an embodiment of this application.

Another implementation scenario is shown in FIG. 1B, which is a schematic diagram of an application scenario of the task guidance method in a virtual scene according to this embodiment of this application. In this application scenario, computation of relevant data of a virtual scene is implemented by the computing capacity of a terminal device 400 and a server 200, and the virtual scene is outputted on the terminal device 400. Taking the formation of visual perception of a virtual scene 100 as an example, the server 200 computes relevant display data (e.g., scene data) of the virtual scene and sends the relevant display data to the terminal device 400 through a network 300. The terminal device 400 implements loading, parsing and rendering of the computed display data by graphics computing hardware, and outputs the virtual scene to form visual perception by graphics output hardware. For example, two-dimensional video frames may be presented on the display screen of a smartphone, or video frames for achieving three-dimensional display effects are projected on the lenses of a pair of augmented reality/virtual reality glasses. For the perception form of the virtual scene, it may be understood that the terminal device 400 may output the perception through the corresponding hardware, for example, forming auditory perception by a microphone, and forming tactile perception by a vibrator.

As an example, a client 410 (e.g., a network version game application) is run on a terminal device 400, and interacts with other users in games by connecting to a server 200 (e.g., a game server). The terminal device 400 outputs a virtual scene 100 for the client 410. The virtual scene 100 may be an environment for game characters to interact, e.g., plains, streets, and valleys for the game characters to engage in battles. The virtual scene 100 includes a virtual object 110 and a non-user character 120. The virtual object 110 may be a game character controlled by a user (also called a player), that is, the virtual object 110 is controlled by a real user and will move in the virtual scene in response to the real user's operations on a controller (including a touch screen, a voice switch, a keyboard, a mouse, a joystick, etc.). For example, when the real user moves the joystick left, the virtual object 110 will move to the left in the virtual scene, and may also remain stationary, jump, or use various functions (e.g., skills and props). The non-user character 120 is an entity object associated with the virtual object 110 in the virtual scene, and may exist in the virtual scene at all times and follow the virtual object 110, or be presented in the virtual scene when called by the virtual object 110. The non-user character 120 is configured to provide guidance for virtual tasks for the virtual object 110 in the virtual scene, for example, guiding the virtual object 110 to perform virtual tasks corresponding to the current interaction progress.

As an example, the terminal receives an interaction guidance instruction for the non-user character associated with the virtual object; task guidance information corresponding to the interaction progress of the virtual object is presented in response to the interaction guidance instruction; the task guidance information is used for guiding the virtual object to perform at least one virtual task; and guidance information for an interaction location corresponding to a target task is presented in response to a confirmation instruction for the target task in the at least one virtual task based on the task guidance information. As the presented task guidance information corresponds to the current interaction progress of the virtual object, a more targeted virtual task is guided to be performed, and the efficiency of virtual task guidance in a virtual scene is improved.

In some embodiments, the terminal device 400 may run a computer program to implement the task guidance method in a virtual scene according to this embodiment of this application. For example, the computer program may be a native program or software module in an operating system; a native application (APP) which can be run only after being installed in an operating system, e.g., a shooting game APP (i.e. the aforementioned client 410); a mini program which can be run after being downloaded into a browser environment; or a game mini program which can be embedded into any APP. In summary, the computer program may be any form of applications, modules, or plug-ins.

Taking the computer program being an application as an example, in actual implementation, an application supporting virtual scenes is installed and run on a terminal device 400. The application may be any one of a First-Person Shooting Game (FPS), a Third-Person Shooting Game, a Virtual Reality Application, a 3D Map Program or a Multi-player Shooting Survival Game. A user may use the terminal device 400 to control a virtual object in the virtual scene to take actions, including but not limited to at least one of: adjusting body posture, crawling, walking, running, riding, jumping, driving, picking, shooting, attacking, throwing, and constructing virtual buildings. Schematically, the virtual object may be a virtual character, e.g., a simulated character or anime character.

In other embodiments, this embodiment of this application may also be implemented by cloud technology, which refers to a hosting technology that unifies hardware, software, network, and other resources within a wide area network or local area network to achieve computation, storage, processing, and sharing of data.

Cloud technology is a general term for network technology, information technology, integration technology, management platform technology, application technology, etc. based on cloud computing business model applications. Cloud technology may form a resource pool to be used as needed, which is flexible and convenient. Cloud computing technology will become an important support. The backend services of technical network systems require a large amount of computing and storage resources.

Exemplarily, the server 200 in FIG. 1B may be an independent physical server, a server cluster including multiple physical servers, a distributed system, or a cloud server for providing basic cloud computing services, e.g., cloud service, cloud database, cloud computing, cloud function, cloud storage, network service, cloud communication, middleware service, domain name service, security service, Content Delivery Network (CDN), big data and artificial intelligence platforms. The terminal device 400 may be a smartphone, a tablet, a laptop, a desktop computer, a smart speaker, a smartwatch, etc., which is not limited thereto. The terminal device 400 and the server 200 may be directly or indirectly connected through wired or wireless communication, which is not limited in this embodiment of this application.

Figures 2, 3:
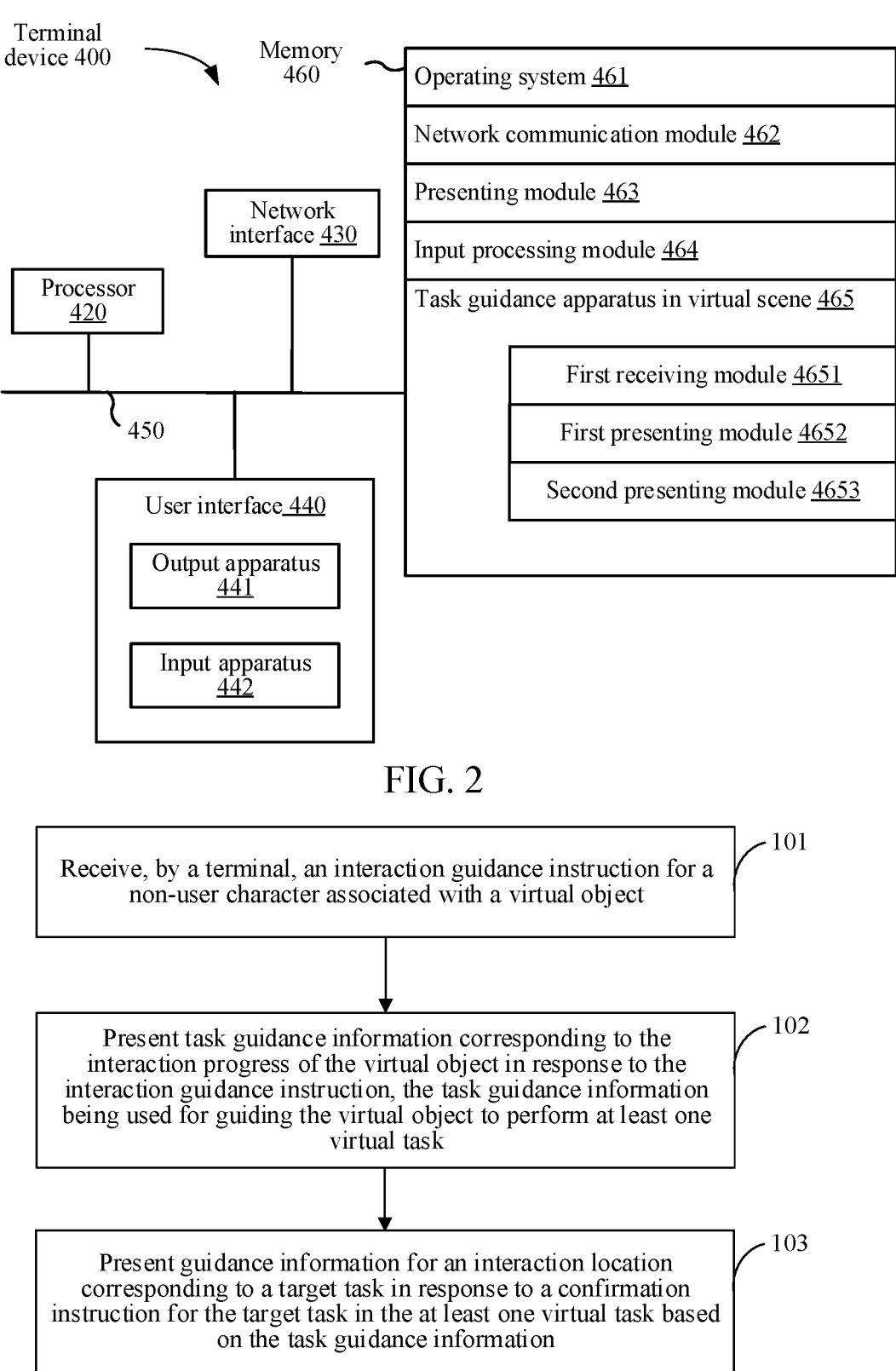
FIG. 2 is a structural schematic diagram of a terminal device 400 according to an embodiment of this application.
FIG. 3 is a flow diagram of a task guidance method in a virtual scene according to an embodiment of this application.

In some embodiments, the method according to this embodiment of this application may be implemented by various electronic devices or computer devices, for example, the method may be implemented by a terminal alone, or by a server alone, or by a terminal and a server in collaboration. An electronic device for implementing the method according to this embodiment of this application will be described in the following. The electronic device may be a terminal device or a server. Taking the electronic device being a terminal device as an example, the structure of the terminal device 400 shown in FIG. 1A will be described. FIG. 2 is a structural schematic diagram of the terminal device 400 according to this embodiment of this application. The terminal device 400 shown in FIG. 2 includes at least one processor 420, a memory 460, at least one network interface 430, and a user interface 440. Various components in the terminal device 400 are coupled together through a bus system 450. It may be understood that, the bus system 450 is configured to implement connection and communication between the components. The bus system 450 includes a data bus, as well as a power bus, a control bus, and a status signal bus. However, for clarity, the various buses are marked as the bus system 450 in FIG. 2.

The processor 420 may be an integrated circuit chip with signal processing capacities, e.g., a general-purpose processor, a Digital Signal Processor (DSP), a programmable logic device, a discrete gate or transistor logic device, a discrete hardware component, or the like, where the general-purpose processor may be a microprocessor or any conventional processor.

The user interface 440 includes one or more output devices 441 for presentation of media contents, the output device(s) including one or more speakers and/or one or more visual display screens. The user interface 440 further includes one or more input devices 442, the input device(s) including user interface components for facilitating user input, e.g., a keyboard, a mouse, a microphone, a touch display screen, a camera, input buttons, and controls.

The memory 460 may be removable, non-removable, or both. Examples of hardware devices include a solid-state memory, a hard disk drive, and an optical disk drive. The memory 460 may include one or more storage devices located physically away from the processor 420.

The memory 460 includes a volatile memory, or a nonvolatile memory, or both. The nonvolatile memory may be a Read Only Memory (ROM). The volatile memory may be a Random Access Memory (RAM). The memory 460 described in this embodiment of this application aims to include any suitable type of memory.

In some embodiments, the memory 460 can store data for supporting various operations, and examples of the data include programs, modules, and data structures, or subsets or supersets thereof, as exemplified below.

An operating system 461 includes system programs for processing various basic system services and performing hardware related tasks, e.g., a framework layer, a core library layer and a driver layer, configured to implement the various basic services and processing hardware based tasks.

A network communication module 462 is configured to reach other computing devices via one or more (wired or wireless) network interfaces 430, and exemplary network interfaces 430 include Bluetooth, Wireless Fidelity (WiFi), a Universal Serial Bus (USB, Universal Serial Bus), etc.

A presentation module 463 is configured to enable presentation of information, e.g., a user interface for operating a peripheral device and displaying contents and information, via one or more output devices 441 associated with the user interface 440 (e.g., a display screen, and a speaker).

An input processing module 464 is configured to detect one or more user inputs or interactions from one of one or more input devices 442, and translate the detected inputs or interactions.

In some embodiments, the task guidance apparatus in a virtual scene according to this embodiment of this application may be implemented in software. FIG. 2 shows a task guidance apparatus 465 in the virtual scene stored in the memory 460. The task guidance apparatus 465 in the virtual scene may be software in the form of a program or a plug-in, and includes the following software modules: a first receiving module 4651, a first presenting module 4652, and a second presenting module 4653. The modules are logical, and thus may be combined or separated according to the implemented functions. The function of each module will be described in the following.

In other embodiments, the task guidance apparatus in a virtual scene according to this embodiment of this application may be implemented in hardware. As an example, the task guidance apparatus in a virtual scene according to this embodiment of this application may be a processor in the form of a hardware decoding processor, and the processor is programmed to perform the task guidance method in a virtual scene according to this embodiment of this application. For example, the processor in the form of the hardware decoding processor may use one or more Application Specific Integrated Circuits (ASICs), DSPs, Programmable Logic Devices (PLDs), Complex Programmable Logic Devices (CPLDs), Field-Programmable Gate Arrays (FPGAs), or other electronic components.

The task guidance method in a virtual scene according to this embodiment of this application will be described in conjunction with the accompanying drawings. The task guidance method in a virtual scene according to this embodiment of this application may be performed by the terminal device 400 alone in FIG. 1A, or by the terminal device 400 and the server 200 in FIG. 1B collaboratively.

The task guidance method in a virtual scene according to this embodiment of this application being performed by the terminal device 400 alone in FIG. 1A will be described as an example in the following. FIG. 3 is a flow diagram of the task guidance method in a virtual scene according to this embodiment of this application, which will be described in conjunction with the steps shown in FIG. 3. The method shown in FIG. 3 may be performed by various forms of computer programs running on the terminal device 400, and is not limited to the aforementioned client 410. That is, the method may also be performed by the aforementioned operating system 461, a software module, and a script. Therefore, the client is not to be considered as limiting this embodiment of this application.

Step 101: Receive, by a terminal, an interaction guidance instruction for a non-user character associated with a virtual object.

The interaction guidance instruction is used for indicating the non-user character to guide virtual tasks for the virtual object in the virtual scene.

Here, a client is installed on the terminal, and the client may be a client of a virtual scene (e.g., a game client), or other clients with game functions (e.g., a video client with a game function). Taking the client being the client of a virtual scene as an example, when the client is run on the terminal, the client displays an interface of the virtual scene and displays a virtual object of the current login account in the interface of the virtual scene. A user may interact with other users' virtual objects in the virtual scene or perform virtual tasks in the virtual scene based on the virtual object. In practical applications, each virtual object may be associated with at least one non-user character. The non-user character may guide virtual tasks for the virtual object in the virtual scene. The guidance may be implemented through an interaction guidance instruction triggered by the terminal in the interface of the virtual scene.

In some embodiments, the terminal may receive the interaction guidance instruction for the non-user character associated with the virtual object by: presenting the non-user character associated with the virtual object in the virtual scene, the non-user character following the virtual object; and receiving the interaction guidance instruction in response to a triggering operation for the non-user character.

Figure 4:
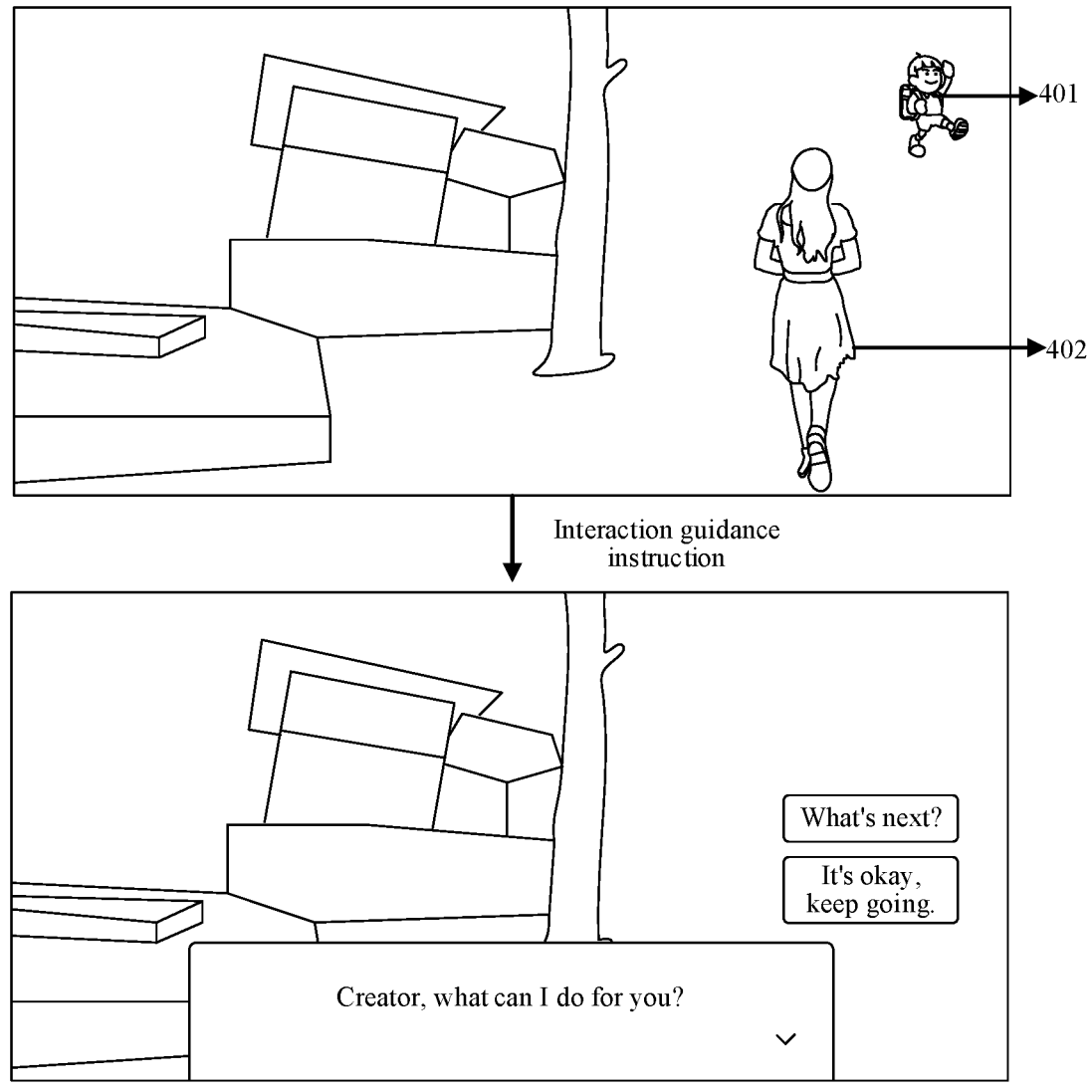
FIG. 4 is a schematic diagram of triggering of an interaction guidance instruction according to an embodiment of this application.

In practical applications, the non-user character may be an entity object associated with the virtual object in the virtual scene. The non-user character may always accompany the virtual object in the virtual scene or only appear in specific scenes. For example, the non-user character may appear to provide guidance for the virtual object when the virtual object is in danger or confusion, or when a call instruction is received from the virtual object. The timing and form of appearance of the non-user character are not limited in this embodiment of this application. FIG. 4 is a schematic diagram of triggering of the interaction guidance instruction according to this embodiment of this application. The non-user character 401 follows the virtual object 402 after appearing in the virtual scene. When a user is uncertain about the next interaction operation or virtual task to be performed in the virtual scene during interaction, the non-user character 401 may be triggered (clicked, double-clicked, long pressed, etc.). The terminal receives the interaction guidance instruction in response to the triggering operation, and presents the corresponding task guidance information for the virtual object to perform interaction guidance.

In some embodiments, the terminal may receive the interaction guidance instruction for the non-user character associated with the virtual object by: presenting a guidance control, the guidance control being used for triggering a guidance session between the virtual object and the non-user character, and the guidance session being used for guiding virtual tasks for the virtual object in the virtual scene; and receiving the interaction guidance instruction in response to a triggering operation for the guidance control.

Figure 5:
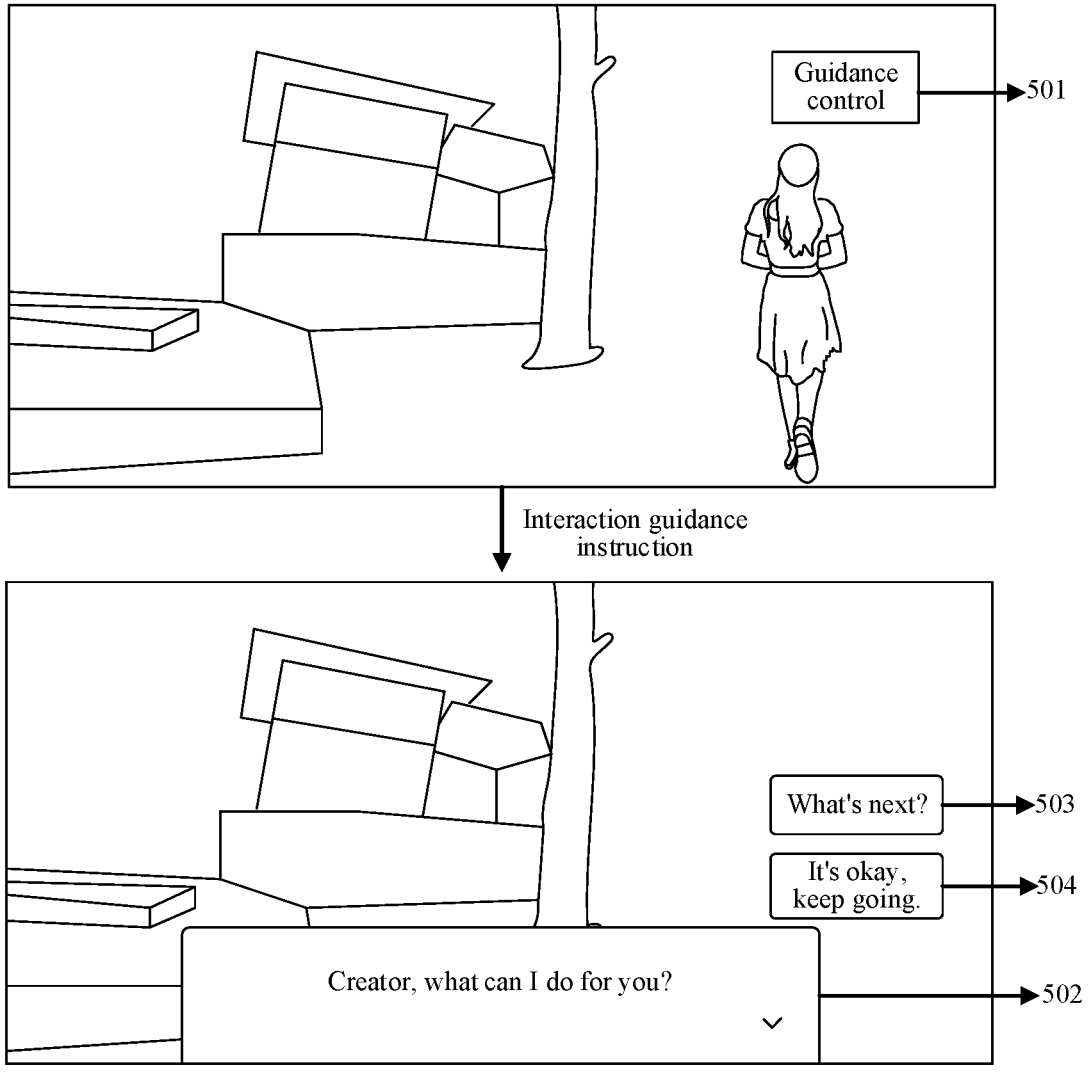
FIG. 5 is a schematic diagram of triggering of an interaction guidance instruction according to an embodiment of this application.

The guidance control is an entry for triggering the guidance session between the virtual object and the non-user character, and is also a tool for the user to interact with the non-user character (e.g., input or manipulate data). The guidance control may be presented in the form of an icon or a button in the interface of the virtual scene, and may be triggered by users at any time to establish a session connection between the non-user character and the virtual object. Through the established session connection, the user may request the non-user character for interaction guidance. FIG. 5 is a schematic diagram of triggering of the interaction guidance instruction according to this embodiment of this application. When a user triggers (clicks, double-clicks, long presses, etc.) the guidance control 501, the terminal establishes a session connection between the non-user character and the virtual object in response to the triggering operation, and receives an interaction guidance instruction to present the corresponding task guidance information for the virtual object to perform interaction guidance.

In some embodiments, the terminal may receive the interaction guidance instruction for the non-user character associated with the virtual object by: presenting a voice input control; presenting collection indication information for indicating the conduction of voice collection in response to the triggering operation for the voice input control, and recognizing the content of the collected voice when the collection indication information indicates that the collection is completed; and receiving the interaction guidance instruction when the content of the voice contains target content associated with the non-user character.

The voice input control is an entry for triggering the guidance session between the virtual object and the non-user character, and is also a tool for the user to call out the non-user character to establish the guidance session. When the user clicks the voice input control, the terminal collects the voice inputted by the user and recognizes the content of the voice. When the user's content contains the target content for calling out the non-user character, the non-user character is called out and the interaction guidance instruction is triggered. The target content is pre-set content for calling out the non-user character associated with the virtual object.

In some embodiments, the terminal may receive the interaction guidance instruction for the non-user character associated with the virtual object by: obtaining a timer for providing timed guidance for the virtual object to perform a virtual task; and receiving the interaction guidance instruction triggered by the timer when a target time is arrived based on the timer and the virtual object has not performed the virtual task during a target time period before the target time.

Here, the target time and the target time period may be set according to the actual situation. The interaction guidance instruction may be triggered in time by a timer, that is, the non-user character is automatically triggered to perform interaction guidance for the virtual object. For example, from 5 pm to 7 pm every day, whether the virtual object has performed a virtual task of constructing a resting place is determined. When it is determined that the virtual object has not yet performed the virtual task of constructing a resting place, the interaction guidance instruction is automatically triggered to guide the virtual object to construct a resting place.

In practical applications, the non-user character may actively provide strong guidance or weak guidance to a virtual object based on the current interaction progress thereof and the necessity of a virtual task to be guided. The strong guidance is used for prompting a virtual task that has to be performed by the virtual object. For example, for a virtual task that has not yet been performed within a target time period but has to be performed, continuous guidance is prompted until the virtual object performs the virtual task. The weak guidance is used for prompting a virtual task suggested to be performed by the virtual object, that is, under the weak guidance, a user may choose to perform or not to perform the virtual task based on the virtual object. For example, for a virtual task that has not yet been performed within a target time period but is not to be necessarily performed, the virtual task is prompted several times (e.g., periodically prompted 3 times). When the number of prompts reaches a preset target number, prompt of the guidance will be stopped. In this way, based on the current interaction progress of the virtual object and the category of the virtual task, interaction guidance suitable for the current scene is proactively provided for players, such that the guidance efficiency and interaction experience are improved.

Step 102: Present task guidance information corresponding to the interaction progress of the virtual object in response to the interaction guidance instruction.

The task guidance information is used for guiding the virtual object to perform at least one virtual task. In some embodiments, the virtual tasks may include at least one of the following tasks: performing a target operation for a virtual object in a virtual scene, making a target prop based on a virtual material in the virtual scene, and performing an interaction operation with at least one target virtual object, for example, excavating underground equipment accessories, money, and other useful things, collecting resources such as wood, stone and ore to make tools and construct houses, killing powerful opponents, and so on.

In practical applications, when a terminal receives an interaction guidance instruction, task guidance information (from a non-user character to a virtual object) for a virtual task to be performed currently is presented in an interface of a virtual scene. For example, in FIG. 5, response information 502 "Creator, what can I do for you?", from a non-user character in response to the triggering operation, is presented in an interface of a virtual scene, and candidate virtual tasks corresponding to the response information 502 are presented for a user to choose, including a virtual task 503 "What's next?" and a virtual task 504 "It's okay, keep going", and the user may choose the virtual task to be performed.

In some embodiments, a terminal may present task guidance information corresponding to the interaction progress of the virtual object by: determining the interaction attributes of the virtual object, including at least one of: interaction preference, interaction level, virtual materials obtained from interaction, and interaction environment; and determining the corresponding interaction progress based on the interaction attributes and presenting the task guidance information corresponding to the interaction progress.

The interaction preference is used for characterizing the interaction propensity of a virtual object, e.g., the preference of a virtual object to make target props (e.g., construct a house), or interact with a target virtual object (e.g., fight with the target object). For virtual objects with specific interaction preferences, the guidance information most needed at different interaction progresses is often different. For a virtual object who prefers to construct rather than fight, a guidance prompt related to fight is often more needed in the early stage of interaction, and a guidance prompt related to construction is often more needed in the later or advanced stage of interaction.

The interaction level refers to the advanced level of interaction between virtual objects. Different interaction levels correspond to virtual tasks with different levels of difficulty or different categories of virtual tasks. For example, the higher the interaction level, the more challenging the corresponding virtual task becomes. The virtual materials refer to the materials obtained by a virtual object in an interaction process. Based on the virtual materials obtained by the virtual object, task guidance information corresponding to the virtual materials is provided. For example, if the virtual object has obtained a large quantity of building materials, guidance prompts related to construction are provided to guide the virtual object to perform the virtual task of constructing a house using the existing building materials. For another example, if the virtual object has not yet obtained any wood, a guidance prompt related to tree chopping is provided to guide the virtual object to perform the virtual task of tree chopping to obtain wood and prepare for subsequent construction of houses or ships. The interaction environment refers to the situation where a virtual object is in a virtual scene, or the environment of a target area aimed by a virtual prop of the virtual object. For example, when a virtual object's sight is aimed at a small island with an enemy, a prompt indicating whether to guide the virtual object to engage with the enemy is presented based on strength comparison between the virtual object and the enemy. If the strength of the virtual object is higher than that of the enemy, and the probability of winning a battle with the enemy is high, a prompt guiding the virtual object to engage with the enemy is presented. If the strength of the virtual object is significantly lower than that of the enemy, and the probability of the virtual object winning a battle with the enemy is low or there is no possibility of winning, a prompt guiding the virtual object not to engage with the enemy is presented.

When guidance prompts are provided to a virtual object based on at least one of the above interaction attributes, the interaction progress of a target virtual task being performed currently by the virtual object is determined based on the interaction attribute of the virtual object, and then task guidance information is determined based on the interaction progress. For example, for a virtual object with construction preference, when the virtual object requests an interaction guidance, and when it is determined that the virtual object is performing construction, task guidance information about construction corresponding to the interaction progress is provided to the virtual object based on the interaction progress of the construction. Thus, the virtual object is provided with the most urgent and suitable virtual task experience for the current interaction situation, the guidance efficiency is high, the virtual objects may experience interaction fun in virtual scenes, and the user retention rate is improved.

In some embodiments, a terminal may present task guidance information corresponding to the interaction progress of the virtual object by: presenting a guidance interface corresponding to the non-user character; and presenting task guidance information corresponding to the interaction progress of the virtual object in the guidance interface. In some embodiments, the guidance interface includes a first display area and a second display area, and a terminal may present task guidance information corresponding to the interaction progress of the virtual object by: displaying guidance questions from the non-user character for the virtual object in the first display area, and displaying candidate virtual tasks corresponding to the guidance questions in the second display area, the candidate virtual tasks corresponding to the interaction progress of the virtual object; and determining the displayed guidance questions and the candidate virtual tasks as the task guidance information.

Figure 6:
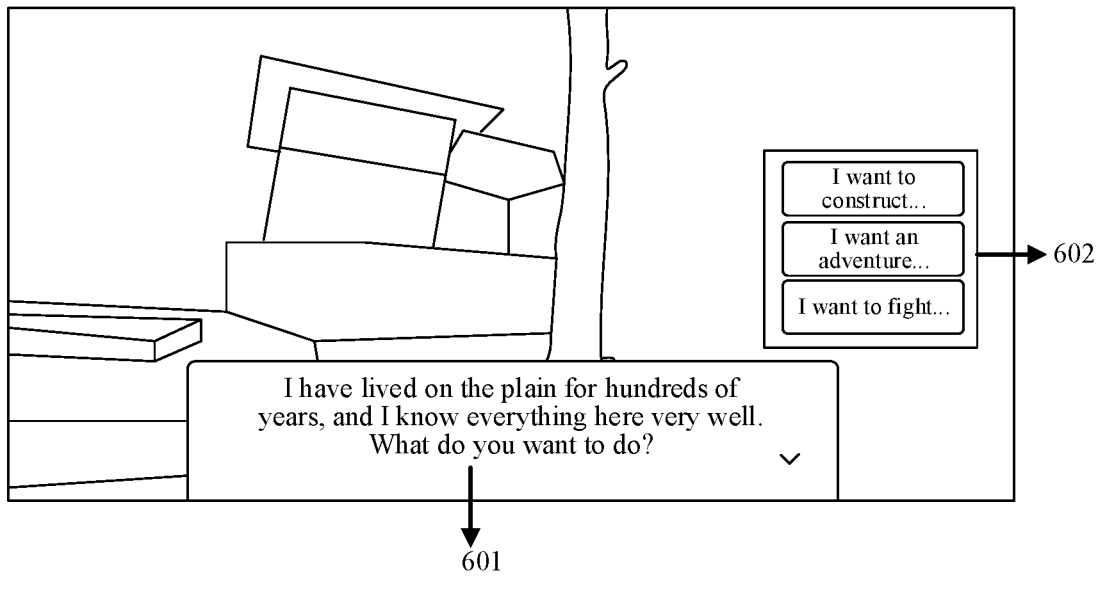
FIG. 6 is a schematic diagram of a display interface of task guidance information according to an embodiment of this application.

Here, the task guidance information may be displayed in a floating window or a pop-up window suspended in the interface of the virtual scene, or in a guidance interface independent of the virtual scene. The task guidance information may be displayed in the form of text or voice. In practical applications, the task guidance information may include guidance questions from a non-user character for a virtual object, as well as candidate virtual tasks for the guidance questions. For example, FIG. 6 is a schematic diagram of a display interface of task guidance information according to this embodiment of this application. The guidance interface includes a first display area 601 and a second display area 602. Guidance questions are displayed in the first display area 601, and candidate virtual tasks for the guidance questions are displayed in the second display area 602. The candidate virtual tasks correspond to the interaction progress of a virtual object, and a user may choose and perform a target task from the candidate virtual tasks.

In some embodiments, a terminal may display candidate virtual tasks corresponding to guidance questions in a second display area by: determining the priority of the candidate virtual tasks when the number of the candidate virtual tasks is at least two; and displaying the candidate virtual tasks corresponding to the guidance questions in the second display area in such a manner that the candidate virtual tasks are displayed in a sequence from the highest priority to the lowest priority.

The priority may be determined based on the importance and urgency of the candidate virtual tasks, and beneficial effects brought about by the candidate virtual tasks to a virtual object. Generally, the more important or urgent a candidate virtual task is, or the higher the beneficial effects brought about by a candidate virtual task is, the higher the corresponding priority is. The candidate virtual tasks are displayed in a sequence from the highest priority to the lowest priority. For example, at the current interaction progress, "Construct" is more in line with the interaction progress than "Adventure". Therefore, when candidate virtual tasks are displayed, the candidate virtual task "Construct" is displayed before the candidate virtual task "Adventure", thereby facilitating users to choose and perform the candidate virtual task most conducive to the current interaction progress, and providing the users with priority options that are more in line with their actual situations. Moreover, the users may choose the virtual tasks more easily, time for choosing from multiple virtual tasks is saved for the users, the efficiency of user choice in case of multiple candidate virtual tasks is improved, and the user experience is improved.

In some embodiments, the second display area includes at least two sub-display areas, each corresponding to a task category. A terminal may display the candidate virtual tasks corresponding to guidance questions in the second display area by: determining the task category to which each candidate virtual task belongs when the number of the candidate virtual tasks is at least two; and displaying the corresponding candidate virtual tasks in the corresponding sub-display area of the second display area according to the task category.

Here, in practical applications, the virtual tasks are divided in multiple task categories based on different attributes of the virtual tasks. For example, the task categories may include: construction, adventure, fight, etc. Usually, each task category includes multiple virtual tasks. For example, construction type virtual tasks may include but are not limited to: Find material A, Find material B, Build house 1, and Build ship 2. Adventure type virtual tasks include but are not limited to: Adventure task 1, Adventure task 2, etc.

When multiple candidate virtual tasks are included in the task guidance information, the candidate virtual tasks belonging to different task categories are displayed in different sub-display areas based on the task categories to which the candidate virtual tasks belong. Therefore, all candidate virtual tasks are displayed without being mixed, a user may easily choose and perform the candidate virtual task that is suitable for the current task category and is most conducive to the current interaction progress, and the user experience is improved.

In some embodiments, a terminal may present task guidance information corresponding to the interaction progress of the virtual object by: presenting the non-user character and presenting a session bubble corresponding to the non-user character in an associated area thereof, the session bubble including task guidance information corresponding to the interaction progress of the virtual object.

Here, when the non-user character provides the task guidance information to the virtual object, the session bubble appears in the associated area of the non-user character, e.g., in a certain position around the non-user character. One or more session bubbles may be presented, and each session bubble may include one or more pieces of task guidance information. Displaying the task guidance information in the session bubbles improves the realism of the prompts, is more in line with a real guidance scene, and improves the user experience.

In some embodiments, a terminal receives inputted session response information for the non-user character and presents the session response information in session bubbles in an associated area of the virtual object; and receives a confirmation instruction for the target task when the session response information represents choice of the target task.

Here, when the non-user character provides the task guidance information in the session bubbles to the virtual object, similarly, the virtual object may give feedback with the session response information in session bubbles for the task guidance information. In some embodiments, the terminal displays the session bubbles of the non-user character and the session bubbles of the virtual object differently, e.g., in different colors or different bubble sizes. When the session response information indicates choice of a target task from multiple candidate virtual tasks and a confirmation instruction is received for the target task, the task guidance information related to the target task is presented in response to the confirmation instruction. In this way, session information is transmitted in session bubbles between the virtual object and the non-user character, improving the realism of the prompts, being more in line with a real guidance scene, and improving the user experience.

In some embodiments, before providing the task guidance information corresponding to the interaction progress of the virtual object, the terminal may also obtain interaction data of the virtual object, and the interaction data is used for indicating the interaction progress of the virtual object in the virtual scene. A machine learning model is called based on the interaction data for performing prediction processing to obtain candidate virtual tasks, and the machine learning model is trained based on the interaction data of training samples and annotated virtual tasks. In this way, by calling a machine learning model to predict the virtual tasks corresponding to the current interaction progress of the virtual object, the candidate virtual tasks recommended for guidance each time can be more suitable and targeted to the current interaction progress. Based on targeted guidance prompts, the guidance efficiency and the user retention rate can be improved.

In practical applications, the aforementioned machine learning model may be a neural network model (e.g., a convolutional neural network, a deep convolutional neural network, a fully connected neural network, or the like), a decision tree model, a gradient lifting tree, multi-layer perceptron, a support vector machine, or the like, which is not specifically limited in this embodiment of this application.

It may be understood that in this embodiment of this application, a user's login account, interaction data, and other related data are involved. When this embodiment of this application is applied to specific products or technologies, it is necessary to obtain the user's permission or consent, and the collection, use, and processing of related data are required to comply with relevant laws, regulations, and standards of relevant countries and regions.

Step 103: Present guidance information for an interaction location corresponding to a target task in response to a confirmation instruction for the target task in the at least one virtual task based on the task guidance information.

The location guidance information is used for indicating the interaction location where the target task is performed. For example, when the target task is tree chopping, the location guidance information is used for indicating the location (e.g., a forest) for tree chopping. In some embodiments, the terminal may present the guidance information for the interaction location corresponding to the target task by: presenting a map of the virtual scene; and displaying the guidance information for the interaction location corresponding to the target task in the map.

Here, when a user chooses a target task from multiple candidate virtual tasks indicated by the task guidance information, the terminal receives a confirmation instruction for the target task in response to the user's choice, presents a map of the virtual scene in the interface of the virtual scene, and presents the guidance information for the interaction location corresponding to the target task in the map. For example, the interaction location corresponding to the target task is highlighted to be distinguished from other locations, and the highlighted interaction location is used as the location guidance information.

Figure 7:
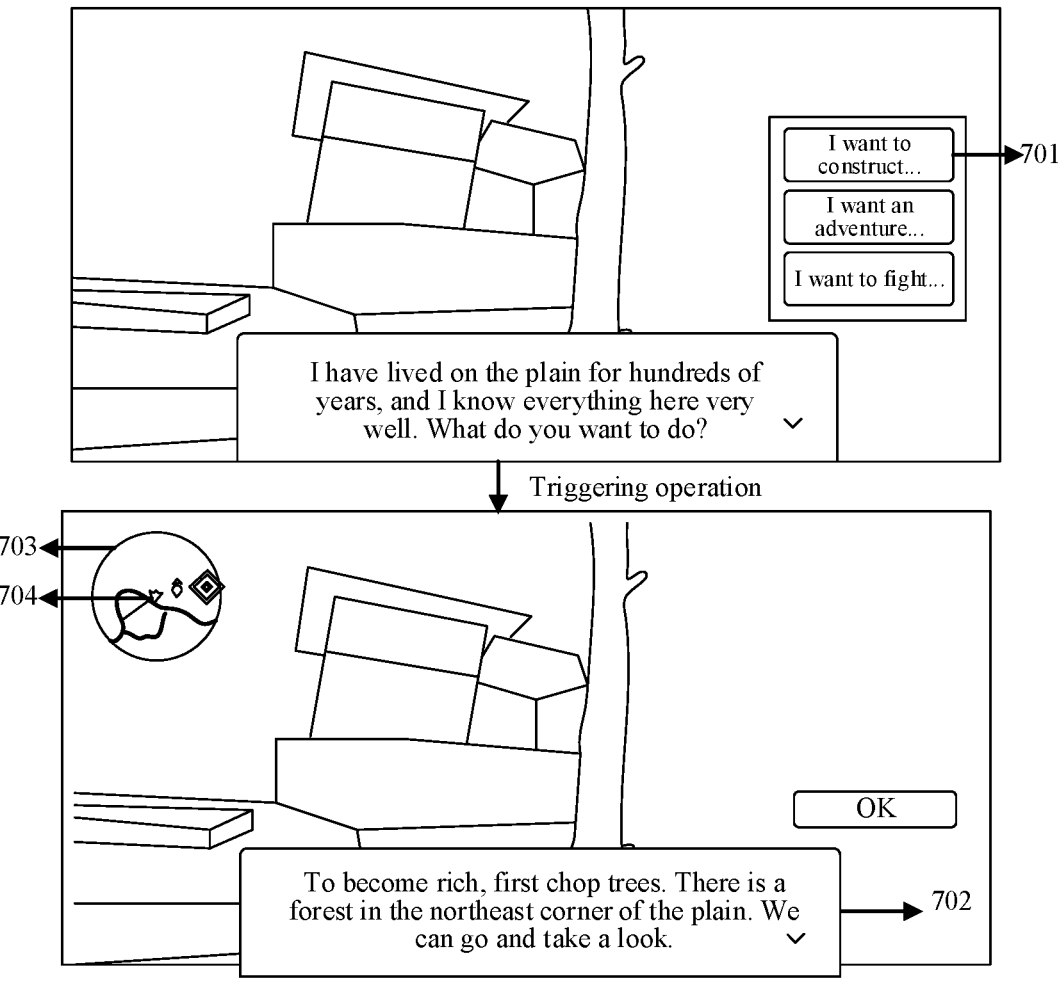
FIG. 7 is a schematic diagram of a display interface of location guidance information according to an embodiment of this application.

FIG. 7 is a schematic diagram of a display interface of location guidance information according to this embodiment of this application. When a user chooses a target task 701 "I want to construct", a terminal presents guidance prompt information 702 for the target task from a non-user character in response to the choice, and also presents a map 703 of the virtual scene. An interaction location 704 corresponding to the target task in the map 703 is displayed in a flashing effect to prompt the user to perform the target task at the interaction location 704.

In some embodiments, when a virtual object moves in a virtual scene, a non-user character follows the virtual object in the virtual scene. A terminal may also display an image of the non-user character following the virtual object in the virtual scene. Correspondingly, the terminal may present the guidance information for the interaction location corresponding to the target task by: in the process of the non-user character following the virtual object, presenting location guidance information from the non-user character for guiding the virtual object to move to the interaction location corresponding to the target task.

In practical applications, as the non-user character may follow the virtual object, when a user chooses a target task from multiple candidate virtual tasks indicated by the task guidance information, the terminal receives a confirmation instruction for the target task in response to the user's choice, and presents location guidance information in text or voice from the non-user character for guiding the virtual object to move to the interaction location corresponding to the target task, e.g., "Go straight ahead for 10 meters and turn left for 5 meters to reach the forest in the northeast corner of the plain.". The user may control the virtual object to move based on the location guidance information from the non-user character, which is more in line with a real guidance scene and improves the user experience. Of course, in practical applications, the location guidance information may also be presented in other forms, e.g., graphics, and animations.

In some embodiments, after the guidance information for the interaction location corresponding to the target task is presented, in response to a control instruction for the virtual object triggered based on the location guidance information, the terminal may also control the virtual object to move towards the interaction location; and control the virtual object to perform the target task at the interaction location when the virtual object moves to the interaction location.

In practical applications, based on the interaction location indicated by the location guidance information for the target task, the user may control the virtual object to move towards the interaction location indicated in the virtual scene by triggering a controller (including but not limited to a touch screen, a voice switch, a keyboard, a mouse, a joystick, an operation control in the interface of the virtual scene, or the like) for controlling the virtual object to move. When the virtual object moves to the interaction location, the user may control the virtual object by the controller to perform the target task at the interaction location.

In some embodiments, after the guidance information for the interaction location corresponding to the target task is presented, the terminal may also output virtual prop guidance information from the non-user character for the virtual object, the virtual prop guidance information being used for guiding the virtual object to use a virtual prop suitable for the target task.

Here, the non-user character not only provides the virtual object with the interaction location for performing the target task, but also provides the guidance prompt information for the virtual prop needed to perform the target task. In this way, the provided guidance prompts for the virtual props are also targeted to control the virtual object to use the most suitable virtual prop to perform the target task, which is more in line with a real guidance scene and improves the user experience.

Figure 8:
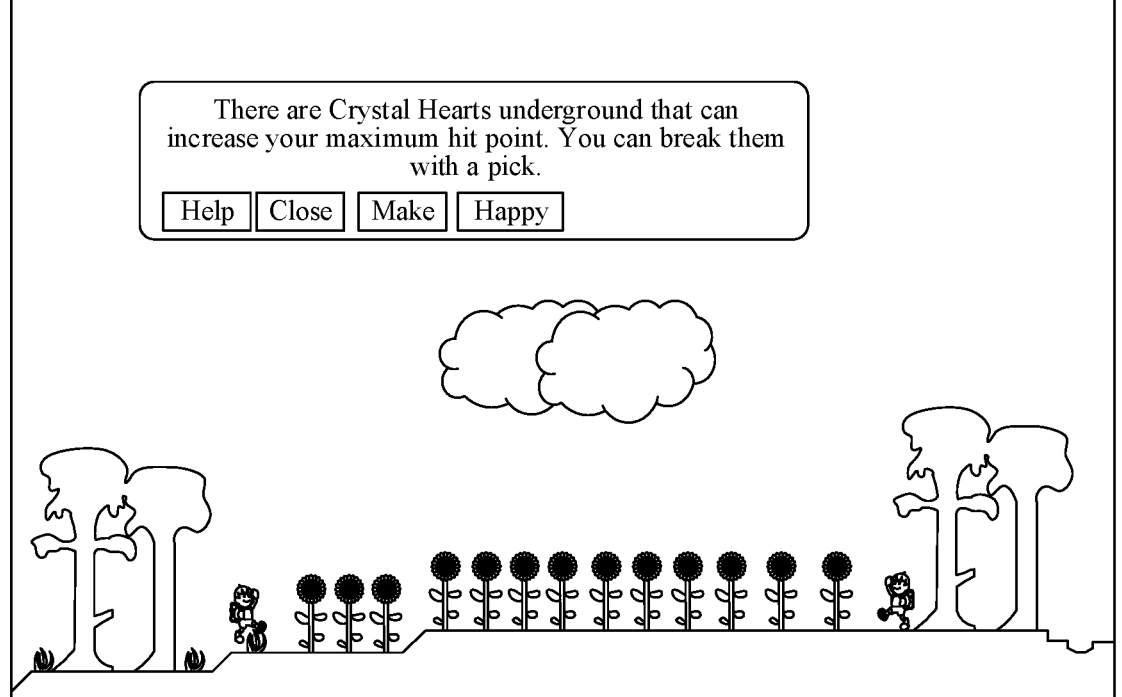
FIG. 8 is a schematic diagram of a guidance prompt interface according to an embodiment of this application.

An exemplary application of this embodiment of this application in a practical application scenario will be explained below. For example, in a virtual scene of a game, when a player (i.e. the aforementioned virtual object) loses the game target during the game and loses focus of the game (i.e. the player does not know what virtual task to perform), the player may seek guidance from a guide (i.e. the aforementioned non-user character). When guidance prompts are provided to a player in the related art, all prompts are displayed in a game. As shown in FIG. 8 which is a schematic diagram of a guidance prompt interface according to this embodiment of this application, unified guidance prompt information and a "Help" control are presented in a game interface. When the presented guidance prompt information is not the currently needed information, the player may click on the "Help" control to switch to the next guidance prompt information continuously until the needed guidance prompt information appears. This method provides all players with the same untargeted guidance prompt information, so that the players cannot easily locate the guidance they need and lose the interaction target, and the user retention rate is reduced. Moreover, the player sometimes has to click on the "Help" control multiple times to obtain the current guidance he/she needs, the guidance path is long and the guidance efficiency is low.

To this end, this embodiment of this application provides a task guidance method in a virtual scene, and the method can provide the most urgent and suitable guidance prompt information to a player based on the player's current game progress (i.e., the interaction progress), so that the player can quickly and conveniently locate the prompt he/she needs, the guidance path is greatly shortened, and the guidance efficiency and the user retention rate are improved.

Figure 9:
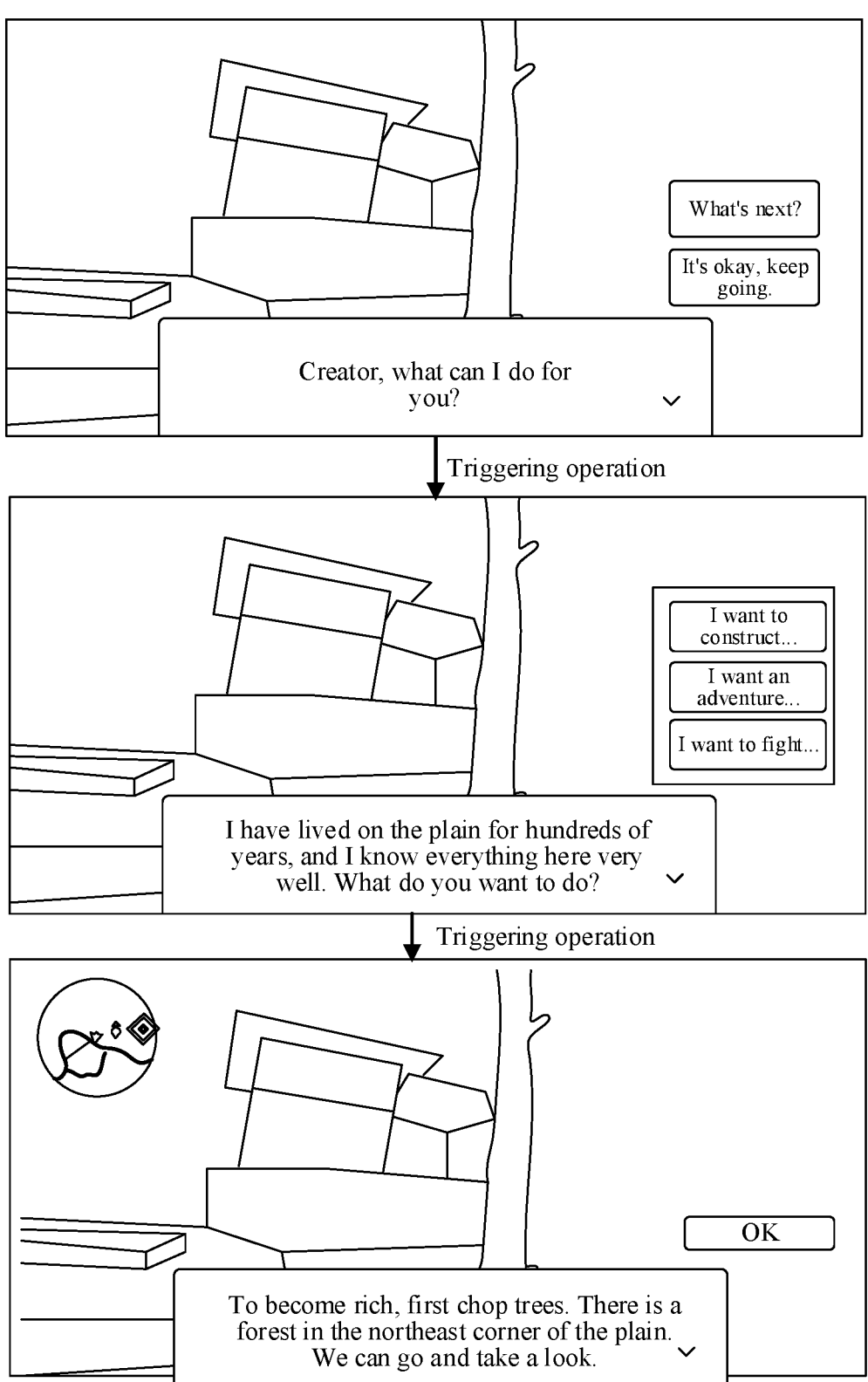
FIG. 9 is a schematic diagram of display of a guidance prompt according to an embodiment of this application.

FIG. 9 is a schematic diagram of display of guidance prompt according to this embodiment of this application. When a player needs guidance prompts, the player may trigger a conversation with a non-user character in the game. At that time, response information, e.g., "Creator, what can I do for you?" is displayed in the guidance interface, and corresponding options, e.g., "What's next?" and "It's okay, keep going.", for users to choose are presented. When the player chooses the option "What's next?", it means that the player wants to receive guidance instructions. At this point, a guidance question, e.g., "I have lived on the plain for hundreds of years, and I know everything here very well. What do you want to do?", is displayed in the guidance interface, and candidate virtual tasks for the guidance question, e.g., "I want to construct.", "I want an adventure.", and "I want to fight.", are displayed. All the candidate virtual tasks correspond to the player's current interaction progress, and a user may choose a target task from the candidate virtual tasks to perform. When the player chooses the target task "I want to construct.", a prompt for the target task is filtered out and presented, for example, guidance information for an interaction location corresponding to the chosen target task is presented. During the prompt, a mini map of the game may be displayed in the upper left corner of the game interface, and the interaction location may be displayed in a flashing effect in the mini map to prompt the player to perform the target task at the interaction location.

In practical implementation, guidance prompts mainly involve the following aspects: guidance conditions, guidance priority, guidance differentiation, and guidance intensity. The guidance conditions refer to the conditions for triggering interaction guidance instructions, and different guidance conditions correspond to different task guidance information. This embodiment of this application strives to provide players with the task guidance information that is most suitable for the current interaction progress. If there is no record of wood obtaining in a player's backpack, the player will be prompted to perform the virtual task of chopping trees. At the same time, a flashing prompt will be displayed in a location of abundant tree resources in the mini map of the game.

The guidance priority is mainly used for setting the display order of guidance prompts. In practical applications, when there are multiple candidate virtual tasks that meet the guidance conditions, the order of guidance prompts for the candidate virtual tasks is determined based on the guidance priority of the candidate virtual tasks. The guidance prompts for the candidate virtual tasks are displayed in a sequence from the highest priority to the lowest priority, making it more convenient for users to choose the candidate virtual tasks that are most conducive to the current interaction progress.

The guidance differentiation is mainly used for classifying guidance prompts based on how deep a player likes to interact. When multiple candidate virtual tasks are included in the task guidance information, the candidate virtual tasks belonging to different task categories are displayed in different display areas based on the task categories to which the candidate virtual tasks belong. Therefore, all candidate virtual tasks are displayed without being mixed, and a user may easily choose and perform the candidate virtual task that is suitable for the current task category and is most conducive to the current interaction progress.

The guidance intensity is mainly used for dividing guidance into strong guidance and weak guidance based on the necessity of guidance. The strong guidance is used for prompting a virtual task that has to be performed by a player. For example, for a virtual task that has not yet been performed within a target time period but has to be performed, continuous guidance is prompted until the player performs the virtual task. The weak guidance is used for prompting a player to perform suggested virtual tasks. For example, for a virtual task that has not yet been performed within a target time period but is not to be necessarily performed, the virtual task is prompted several times. When the number of prompts reaches a preset target number, prompt of the guidance will be stopped. In this way, based on the current interaction progress of a player and the guidance necessity of a virtual task, interaction guidance suitable for the current scene is proactively provided for the player, such that the guidance efficiency and interaction experience are improved.

The above may be achieved through the guidance prompt tables shown in Tables 1 and 2: Table 1 shows the prompt types (e.g., construction prompts, creation prompts, and fight prompts), prompt priority sequence numbers, prompt conditions, prompt intensity (number of times of prompts), and dialogue content for different types of virtual tasks.

TABLE 1

| No. | Prompt type | Number of times of prompts | Prompt conditions | Prompt content |
| --- | --- | --- | --- | --- |
| 1 | Construction prompt | 2 | 16:30-19:00 for the first 5 days every day | Evening draws nigh. Finding a place to rest and building your own home would be a good choice |
| 1 | Construction prompt | / | No record of wood is found on a player | To become rich, first chop trees. There is a forest with abundant tree resources in the northeast corner of the plain. We can go and take a look. |
| 2 | Exploration prompt | / | A player owns wood and has never used a workbench. | I went to an abandoned cabin by the seaside a few days ago, and there was a workbench inside. I tried it and it still worked. |
| 3 | Fight prompt | / | A player's lens ray reaches an island and has an attack power of less than 20. | You have already seen the island in the distance, and you cannot defeat the enemies with your current strength. If you go to the island now, your life will be in danger. |

Table 2 shows when the task guidance information indicates the interaction location corresponding to the virtual task, each virtual task corresponds to a mark ID, and is displayed in the mini map of the game as the mark ID.

TABLE 2

| Mark ID | Level | Type | Location | Name | Content layout template | Content text | Button layout template | Button name |
|---------|-------|------|----------|------|-------------------------|--------------|------------------------|-------------|
| 1001 | 1 | 1 | 100, 200 | Core tree | 1 | Location of core tree | 1 | Pass on |
| 1002 | 2 | 1 | 200, 200 | Obelisk | 1 | Location of obelisk | 1 | Trace |
| 1003 | 3 | 1 | 300, 300 | Store | 1 | Location of store | 1 | Trace |
| 2001 | 1 | 2 | | | 2 | | 1 | Confirm |
| 2002 | 1 | 3 | | | 2 | | 2 | Delete |
| 3001 | 1 | 4 | | | 3 | | 1 | Trace |

Figure 10:
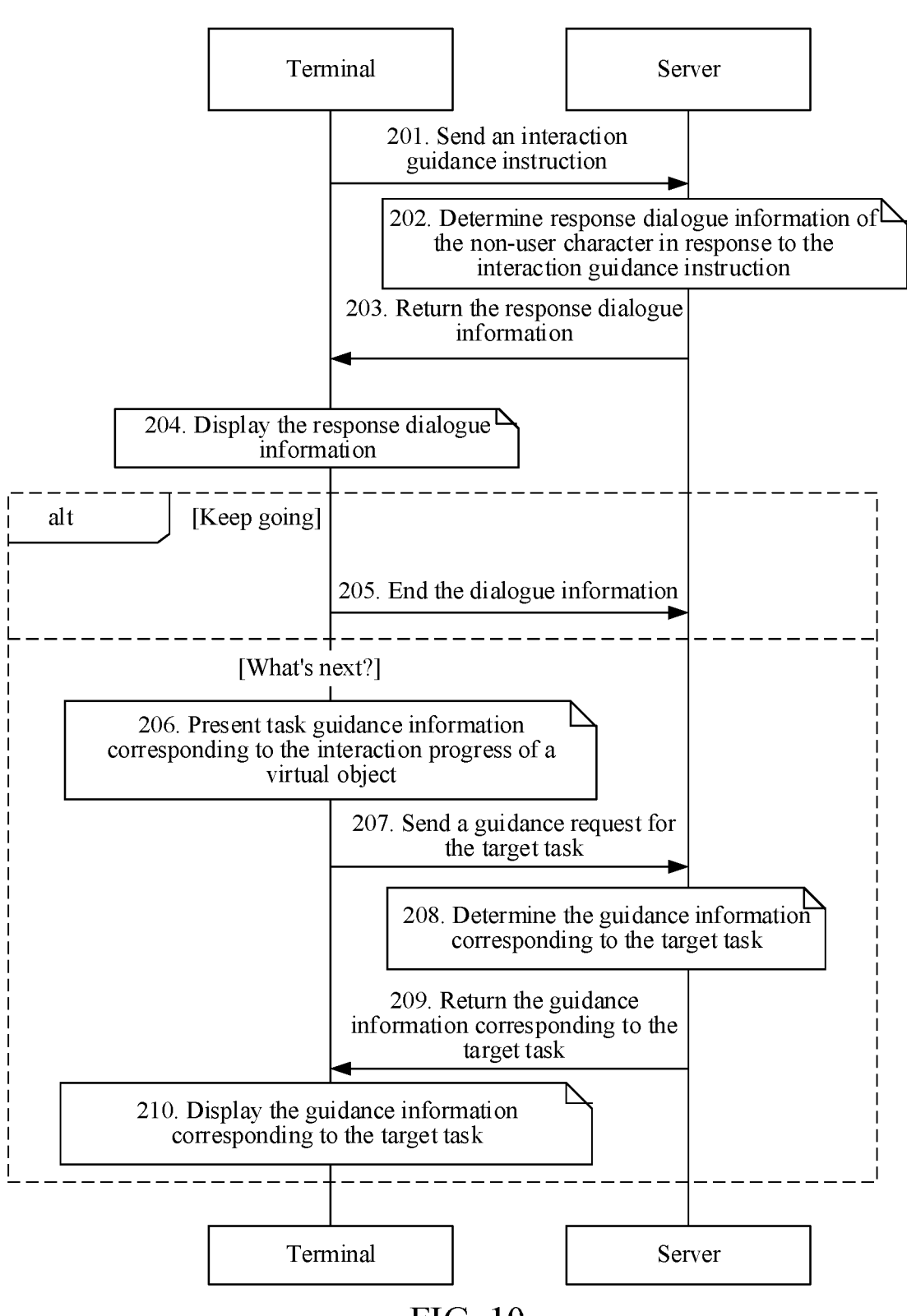
FIG. 10 is a flow diagram of a task guidance method in a virtual scene according to an embodiment of this application.

FIG. 10 is a flowchart of a task guidance method in a virtual scene according to this embodiment of this application. The task guidance method in a virtual scene according to this embodiment of this application being coordinatively performed by a terminal and a server will be described as an example in the following, and the method includes the following steps:

Step 201: Receive and send, by the terminal, an interaction guidance instruction to the server in response to a triggering operation for a guidance control.

The guidance control is used for triggering a guidance session between a player and a non-user character, the guidance session is used for guiding game tasks for a player in a game, and the interaction guidance instruction is used for requesting the non-user character based on guidance prompt information.

Step 202: Determine, by the server, response dialogue information of the non-user character in response to the interaction guidance instruction.

Step 203: Return, by the server, the response dialogue information to the terminal.

After receiving the interaction guidance instructions, the server triggers a guidance dialogue act of the non-user character, for example, the non-user character is controlled to turn to the player, and then the response dialogue information configured for the guidance dialogue act is fed back to the terminal and displayed.

Step 204: Display, by the terminal, the response dialogue information.

The response dialogue information includes response information and response options, e.g., the response information is "Creator, what can I do for you?", and the response options include a first option "What's next?" and a second option "It's okay, keep going.".

Step 205: End, by the terminal, the dialogue information in response to a triggering operation for the second option.

Here, when a player chooses the option "It's okay, keep going.", the terminal will send end dialogue information to the server. Upon receiving the end information, the server will end the guidance dialogue act of the non-user character to cancel the dialogue between the player and the non-user character displayed on the terminal.

Step 206: Present, by the terminal, task guidance information corresponding to the interaction progress of a virtual object in response to a triggering operation for the first option.

For example, when the player chooses the option "What's next?", it means that the player wants to receive guidance instructions. At this point, the next dialogue is displayed, i.e., task guidance information is displayed in the guidance interface. The task guidance information includes a guidance question and candidate virtual tasks corresponding to the guidance question, e.g., a guidance question "I have lived on the plain for hundreds of years, and I know everything here very well. What do you want to do?", is displayed, and candidate virtual tasks such as "I want to construct.", "I want an adventure.", and "I want to fight." for the guidance question, are displayed. All the candidate virtual tasks correspond to the player's current interaction progress, and a user may choose a target task from multiple candidate virtual tasks to perform.

Step 207: Send, by the terminal, a guidance request for the target task to the server in response to a confirmation instruction for the target task based on the task guidance information.

The guidance request carries a task identifier of the target task.

Step 208: Determine, by the server, the guidance information corresponding to the target task based on the guidance request.

Here, the server filters out the guidance information corresponding to the target task based on the task identifier in the guidance request. The guidance information may be the guidance information for the interaction location corresponding to the target task. For example, when the target task is a tree cutting task, the guidance information indicates the location (e.g., a forest) for tree cutting.

In practical applications, to provide appropriate prompts based on the prompt type, in addition to Tables 1-2, a prompt list corresponding to each prompt type may also be recorded based on a guidance prompt table shown in Table 3 and a prompt type table shown in Table 4.

TABLE 3

| Guidance prompt | #Prompt name | Prompt type | Strong prompt or not | Number of times of prompts | Prompt priority | Prompt conditions | Dialogue content |
|-----------------|--------------|-------------|----------------------|----------------------------|-----------------|-------------------|------------------|
| 1 | Wood | 1 | 1 | | 1 | 1 | 106 |
| 2 | Environment | 2 | 0 | 2 | 1 | 2 | 102 |

TABLE 3-continued

| Guidance prompt | #Prompt name | Prompt type | Strong prompt or not | Number of times of prompts | Prompt priority | Prompt conditions | Dialogue content |
|---|---|---|---|---|---|---|---|
| 3 | Fight | 3 | 1 | | 1 | 3 | 103 |
| 4 | Manufacture | 2 | 1 | | 2 | 4 | 101 |

TABLE 4

| Prompt type | #Description | Prompt list |
|---|---|---|
| 1 | Exploration prompt | 1 |
| 2 | Creation prompt | 2, 4 |
| 3 | Fight prompt | 3 |

Figure 11:
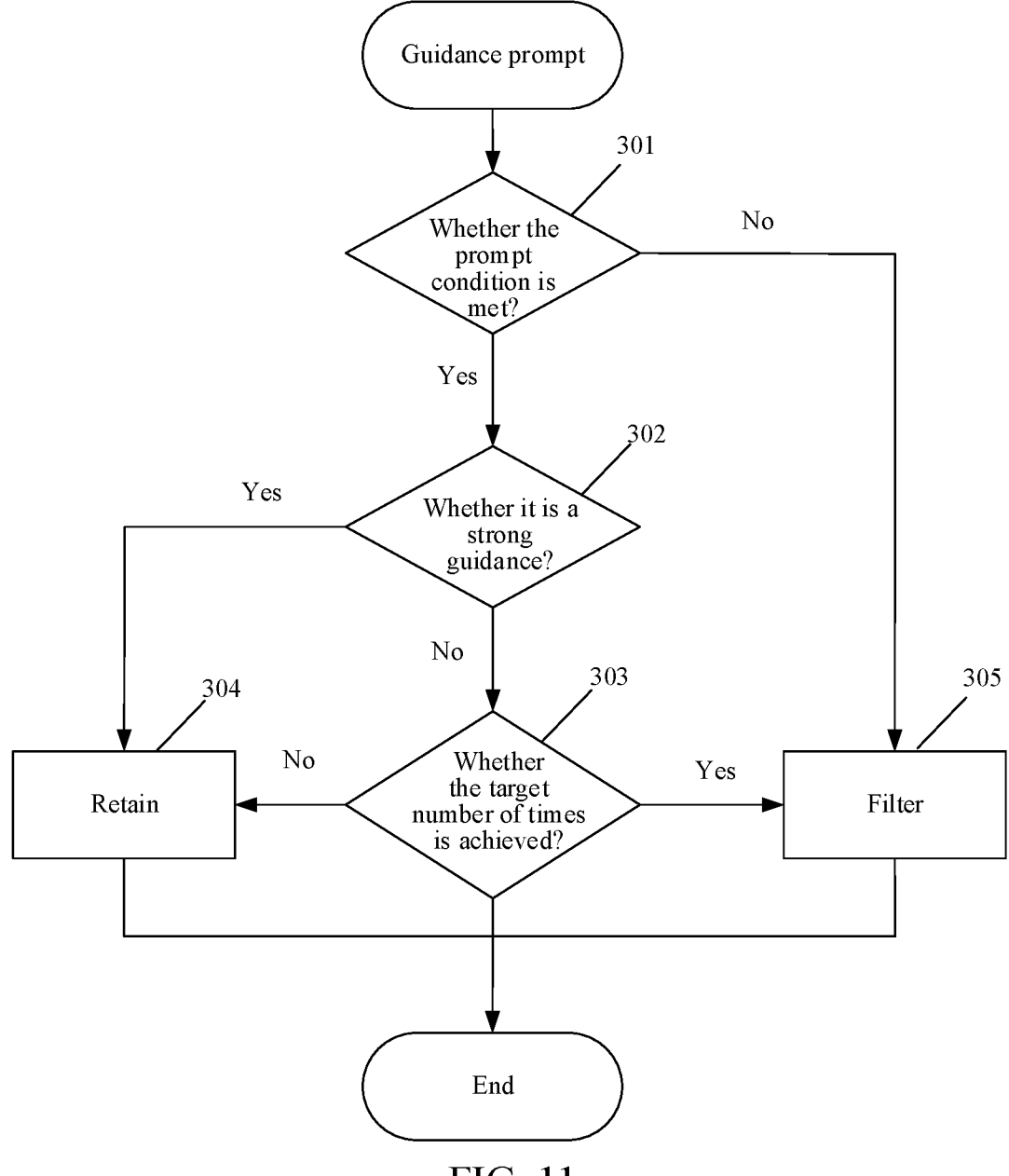
FIG. 11 is a schematic diagram of filtering of guidance information according to an embodiment of this application.

FIG. 11 is a schematic diagram of filtering of guidance information according to this embodiment of this application, corresponding to three options "I want an adventure.", "I want to construct.", and "I want to fight.". Guidance prompts are divided into three categories, i.e. "exploration prompts", "creation prompts", and "fight prompts". Each category of prompts may contain multiple prompt lists. When obtaining the option chosen by a user, a server first obtains a prompt list corresponding to the prompt type. For every guidance prompt in the prompt list, the guidance prompts are first grouped and displayed in a sequence based on the prompt priority. Prompts with the same priority are grouped and displayed in a sequence from the highest to the lowest priority. Then, steps 301 to 305 as shown in FIG. 11 are performed on the group of guidance prompts with the highest priority. In step 301, whether the prompt conditions are met is determined. When it is determined that the prompt conditions are met, step 302 is performed; otherwise, step 305 is performed. In step 302, whether the guidance prompt is strong guidance is determined. When the guidance prompt is strong guidance, step 304 is performed; otherwise, step 303 is performed. In step 303, whether the number of times of the guidance prompt has reached a preset target number of times (e.g., 5 times) is determined. When the target number of times is not reached, step 304 is performed, and the guidance prompt is retained in step 304. When the target number of times is reached, step 305 is performed, and the guidance prompt is filtered in step 305. In this way, filtration is performed based on whether the prompt conditions are met and whether the guidance is weak, and a guidance prompt is randomly chosen from the filtered group, returned to the terminal and displayed. If all guidance prompts in the prompt group with the highest priority have been filtered out, the group with the next priority is filtered and chosen, and so on. If all guidance prompts in the prompt lists do not meet the conditions, a player will be informed that he/she has completed all the content of the guidance and the guidance dialogue act will be ended.

Step 209: Return, by the server, the guidance information corresponding to the target task to the terminal.

Step 210: Display, by the terminal, the guidance information corresponding to the target task.

Here, after receiving the guidance information returned by the server, the terminal displays the guidance information in a corresponding way based on the category thereof. For example, when the guidance information indicates the guidance information for the interaction location for performing the target task, the game's mini map may be displayed in the upper left corner of a game interface, and the interaction location may be displayed in a flashing effect in the mini map to prompt a player to perform the target task at the interaction location, providing the player with game destinations and game experience goals. When the player clicks on an exit control for exiting from the guidance in the game interface, or clicks on any position in the game interface, the terminal sends end dialogue information to the server in response to the user's triggering operation. The server receives the end dialogue information and ends the guidance dialogue act.

By the above method, when a player loses the game goal in a game process, this embodiment of this application provides the most urgent next game goal based on the player's personal game preference and current game progress, and helps the player focus on the next act to continue the game. Therefore, the player can quickly and conveniently locate the prompt he/she needs, the guidance path is greatly shortened, and the guidance efficiency is improved. Also, when guidance prompts are provided by the non-user character, the prompt content may be packed in text to improve the realism of the prompts, thereby ensuring the immersion and empathy engagement of open world games, improving the user experience, and further improving the user retention rate.

An exemplary structure of a task guidance apparatus 465 in a virtual scene according to this embodiment of this application implemented as a software module is described below. In some embodiments, the software modules in the task guidance apparatus 465 in a virtual scene stored in a memory 460 in FIG. 2 may include:

a first receiving module 4651, configured to receive an interaction guidance instruction for a non-user character associated with a virtual object, the interaction guidance instruction being used for indicating the non-user character to guide virtual tasks for the virtual object in a virtual scene;

a first presenting module 4652, configured to present task guidance information corresponding to the interaction progress of the virtual object in response to the interaction guidance instruction, the task guidance information being used for guiding the virtual object to perform at least one virtual task; and a second presenting module 4653, configured to present guidance information for an interaction location corresponding to a target task in response to a confirmation instruction for the target task in the at least one virtual task based on the task guidance information.

In some embodiments, the first receiving module is further configured to present the non-user character associated with the virtual object in the virtual scene, the non-user character following the virtual object; and receive the interaction guidance instruction in response to a triggering operation for the non-user character.

In some embodiments, the first receiving module is further configured to present a guidance control, the guidance control being used for triggering a guidance session between the virtual object and the non-user character, and the guidance session being used for guiding virtual tasks for the virtual object in the virtual scene; and receive the interaction guidance instruction in response to a triggering operation for the guidance control.

In some embodiments, the first receiving module is further configured to present a voice input control; present collection indication information for indicating the conduction of voice collection in response to the triggering operation for the voice input control, and recognize the content of the collected voice when the collection indication information indicates that the collection is completed; and receive the interaction guidance instruction when the content of the voice contains target content associated with the non-user character.

In some embodiments, the first receiving module is further configured to obtain a timer for providing timed guidance for a virtual object to perform a virtual task; and receive the interaction guidance instruction triggered by the timer when a target time is arrived based on the timer and the virtual object has not performed the virtual task during a target time period before the target time.

In some embodiments, the first presenting module is further configured to present a guidance interface corresponding to the non-user character; and present task guidance information corresponding to the interaction progress of the virtual object in the guidance interface.

In some embodiments, the guidance interface includes a first display area and a second display area. The second presenting module is further configured to display guidance questions from the non-user character for the virtual object in the first display area, and display candidate virtual tasks corresponding to the guidance questions in the second display area, the candidate virtual tasks corresponding to the interaction progress of the virtual object; and determine the displayed guidance questions and the candidate virtual tasks as the task guidance information.

In some embodiments, the first presenting module is further configured to determine the priority of the candidate virtual tasks when the number of the candidate virtual tasks is at least two; and display the candidate virtual tasks corresponding to the guidance questions in the second display area in such a manner that the candidate virtual tasks are displayed in a sequence from the highest priority to the lowest priority.

In some embodiments, the second display area includes at least two sub-display areas, each corresponding to a task category. The first presenting module is further configured to determine the task category to which each candidate virtual task belongs when the number of the candidate virtual tasks is at least two; and display the corresponding candidate virtual tasks in the corresponding sub-display area in the second display area according to the task category.

In some embodiments, the second presenting module is further configured to present the non-user character and present a session bubble corresponding to the non-user character in an associated area thereof, the session bubble including task guidance information corresponding to the interaction progress of the virtual object.

In some embodiments, the apparatus further includes: a second receiving module, configured to receive inputted session response information for the non-user character, and present the session response information in session bubbles in an associated area of the virtual object; and receive a confirmation instruction for the target task when the session response information represents choice of the target task.

In some embodiments, the first presenting module is further configured to determine the interaction attributes of the virtual object, including at least one of: interaction preference, interaction level, virtual materials obtained from interaction, and interaction environment; and determine the corresponding interaction progress based on the interaction attributes and present the task guidance information corresponding to the interaction progress.

In some embodiments, the second presenting module is further configured to present a map of the virtual scene; and display the guidance information for the interaction location corresponding to the target task in the map.

In some embodiments, the apparatus further includes: a third presenting module, configured to display an image of the non-user character following the virtual object in the virtual scene; and the second presenting module is further configured to in the process of the non-user character following the virtual object, present location guidance information from the non-user character for guiding the virtual object to move to the interaction location corresponding to the target task.

In some embodiments, after the guidance information for the interaction location corresponding to the target task is presented, the apparatus further includes a motion control module, configured to in response to a control instruction for the virtual object triggered based on the location guidance information, control the virtual object to move towards the interaction location; and control the virtual object to perform the target task at the interaction location when the virtual object moves to the interaction location.

In some embodiments, after the guidance information for the interaction location corresponding to the target task is presented, the apparatus further includes a guidance output module, configured to output virtual prop guidance information from the non-user character for the virtual object, the virtual prop guidance information being used for guiding the virtual object to use a virtual prop suitable for the target task.

An embodiment of this application provides a computer program product or computer program that includes computer instructions stored in a non-transitory computer-readable storage medium. A processor of a computer device reads the computer instructions from the computer-readable storage medium, and the processor executes the computer instructions, such that the computer device performs the task guidance method in a virtual scene according to the embodiments of this application.

An embodiment of this application provides a non-transitory computer-readable storage medium where executable instructions are stored. When executed by the processor, the executable instructions cause the processor to perform the task guidance method in a virtual scene provided in the embodiments of this application, e.g., the method shown in FIG. 3.

In some embodiments, the computer-readable storage medium may be a Ferroelectric Random Access Memory (FRAM), a Read-Only Memory (ROM), a Programmable Read Only Memory (PROM), an Erasable Programmable Read-Only Memory (EPROM), an Electrically Erasable Programmable Read-Only Memory (EEPROM), a flash memory, a magnetic surface storage, an optic disc, or a Compact Disc Read-Only Memory (CD-ROM). The computer-readable storage medium may also be various devices including one or more of the aforementioned memories.

In some embodiments, the executable instructions may be in the form of programs, software, software modules, scripts, or code, written in any form of programming language (including compiled or interpreted languages, or declarative or procedural languages), and may be deployed in any form of, including standalone programs or modules, components, subroutines, or other units suitable for use in computing environments.

As an example, the executable instructions may and may not necessarily correspond to a file in a file system, and may be stored in a portion of a file that stores other programs or data, for example, in one or more scripts in a Hyper Text Markup Language (HTML) document, in a single file dedicated to a program being discussed, or, in multiple collaborative files (e.g., one or more modules, subprograms, or files of code sections). In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

As an example, the executable instructions may be deployed to be executed on one computing device, or on multiple computing devices located in one location, or on multiple computing devices distributed across multiple locations and interconnected through communication networks.

The above are only embodiments of this application and are not intended to limit the scope of protection of this application. Any modifications, equivalent replacements, and improvements made within the spirit and scope of this application are included in the scope of protection of this application.

What is claimed is:

1. A task guidance method in a virtual scene performed by an electronic device, the method comprising:

obtaining a timer for providing timed guidance for a virtual object to perform a virtual task;

receiving an interaction guidance instruction for a non-user character associated with the virtual object in the virtual scene when the virtual object has not performed the virtual task during a target time period before a target time based on the timer arrives;

in response to the interaction guidance instruction, presenting task guidance information based on current interaction progress of the virtual object for guiding the virtual object to perform at least one virtual task; and in response to a confirmation instruction for a target task in the at least one virtual task based on the task guidance information, presenting guidance information for an interaction location corresponding to the target task.

2. The method according to claim 1, wherein the receiving an interaction guidance instruction for a non-user character associated with a virtual object in the virtual scene comprises:

presenting the non-user character associated with the virtual object in the virtual scene, the non-user character following the virtual object; and receiving the interaction guidance instruction in response to a triggering operation for the non-user character.

3. The method according to claim 1, wherein the receiving an interaction guidance instruction for a non-user character associated with a virtual object in the virtual scene comprises:

presenting a guidance control, the guidance control being used for triggering a guidance session between the virtual object and the non-user character, and the guidance session being used for guiding virtual tasks for the virtual object in the virtual scene; and receiving the interaction guidance instruction in response to a triggering operation for the guidance control.

4. The method according to claim 1, wherein the receiving the interaction guidance instruction for the non-user character associated with the virtual object in the virtual scene comprises:

presenting a voice input control;

presenting collection indication information for indicating the conduction of voice collection in response to the triggering operation for the voice input control, and recognizing the content of the collected voice when the collection indication information indicates that the collection is completed; and receiving the interaction guidance instruction when the content of the voice contains target content associated with the non-user character.

5. The method according to claim 1, wherein the presenting task guidance information based on current interaction progress of the virtual object comprises:

presenting a guidance interface corresponding to the non-user character; and presenting task guidance information based on the current interaction progress of the virtual object in the guidance interface.

6. The method according to claim 1, wherein the presenting task guidance information corresponding to the interaction progress of the virtual object comprises:

determining the interaction attributes of the virtual object, comprising at least one of: interaction preference, interaction level, virtual materials obtained from interaction, and interaction environment; and determining the corresponding interaction progress based on the interaction attributes and presenting the task guidance information corresponding to the interaction progress.

7. The method according to claim 1, wherein the method further comprises:

controlling the non-user character to follow the virtual object in the virtual scene; and the presenting guidance information for an interaction location corresponding to the target task comprises:

presenting location guidance information in the process of the non-user character following the virtual object, the location guidance information being from the non-user character for guiding the virtual object to move to the interaction location corresponding to the target task.

8. The method according to claim 1, wherein the method further comprises:

controlling the virtual object to move towards the interaction location in response to a control instruction for the virtual object, based on the location guidance information; and controlling the virtual object to perform the target task at the interaction location when the virtual object moves to the interaction location.

9. An electronic device, comprising:

a memory, configured to store executable instructions; and a processor, configured to, when executing the executable instructions stored in the memory, cause the electronic device to implement a task guidance method in a virtual scene including:

obtaining a timer for providing timed guidance for a virtual object to perform a virtual task;

receiving an interaction guidance instruction for a non-user character associated with the virtual object in the virtual scene when the virtual object has not performed the virtual task during a target time period before a target time based on the timer arrives;

in response to the interaction guidance instruction, presenting task guidance information based on current interaction progress of the virtual object for guiding the virtual object to perform at least one virtual task; and in response to a confirmation instruction for a target task in the at least one virtual task based on the task guidance information, presenting guidance information for an interaction location corresponding to the target task.

10. The electronic device according to claim 9, wherein the receiving an interaction guidance instruction for a non-user character associated with a virtual object in the virtual scene comprises:

presenting the non-user character associated with the virtual object in the virtual scene, the non-user character following the virtual object; and receiving the interaction guidance instruction in response to a triggering operation for the non-user character.

11. The electronic device according to claim 9, wherein the receiving an interaction guidance instruction for a non-user character associated with a virtual object in the virtual scene comprises:

presenting a guidance control, the guidance control being used for triggering a guidance session between the virtual object and the non-user character, and the guidance session being used for guiding virtual tasks for the virtual object in the virtual scene; and receiving the interaction guidance instruction in response to a triggering operation for the guidance control.

12. The electronic device according to claim 9, wherein the receiving the interaction guidance instruction for the non-user character associated with the virtual object in the virtual scene comprises:

presenting a voice input control;

presenting collection indication information for indicating the conduction of voice collection in response to the triggering operation for the voice input control, and recognizing the content of the collected voice when the collection indication information indicates that the collection is completed; and receiving the interaction guidance instruction when the content of the voice contains target content associated with the non-user character.

13. The electronic device according to claim 9, wherein the presenting task guidance information based on current interaction progress of the virtual object comprises:

presenting a guidance interface corresponding to the non-user character; and presenting task guidance information based on the current interaction progress of the virtual object in the guidance interface.

14. The electronic device according to claim 9, wherein the presenting task guidance information corresponding to the interaction progress of the virtual object comprises:

determining the interaction attributes of the virtual object, comprising at least one of: interaction preference, interaction level, virtual materials obtained from interaction, and interaction environment; and determining the corresponding interaction progress based on the interaction attributes and presenting the task guidance information corresponding to the interaction progress.

15. The electronic device according to claim 9, wherein the method further comprises:

controlling the non-user character to follow the virtual object in the virtual scene; and the presenting guidance information for an interaction location corresponding to the target task comprises:

presenting location guidance information in the process of the non-user character following the virtual object, the location guidance information being from the non-user character for guiding the virtual object to move to the interaction location corresponding to the target task.

16. The electronic device according to claim 9, wherein the method further comprises:

controlling the virtual object to move towards the interaction location in response to a control instruction for the virtual object, based on the location guidance information; and controlling the virtual object to perform the target task at the interaction location when the virtual object moves to the interaction location.

17. A non-transitory computer-readable storage medium storing executable instructions, the executable instructions being configured to, when executed by a processor of an electronic device, cause the electronic device to implement a task guidance method in a virtual scene including:

obtaining a timer for providing timed guidance for a virtual object to perform a virtual task;

receiving an interaction guidance instruction for a non-user character associated with the virtual object in the virtual scene when the virtual object has not performed the virtual task during a target time period before a target time based on the timer arrives;

in response to the interaction guidance instruction, presenting task guidance information based on current interaction progress of the virtual object for guiding the virtual object to perform at least one virtual task; and in response to a confirmation instruction for a target task in the at least one virtual task based on the task guidance information, presenting guidance information for an interaction location corresponding to the target task.

18. The non-transitory computer-readable storage medium according to claim 17, wherein the receiving an interaction guidance instruction for a non-user character associated with a virtual object in the virtual scene comprises:

presenting the non-user character associated with the virtual object in the virtual scene, the non-user character following the virtual object; and receiving the interaction guidance instruction in response to a triggering operation for the non-user character.

19. The non-transitory computer-readable storage medium according to claim 17, wherein the receiving an interaction guidance instruction for a non-user character associated with a virtual object in the virtual scene comprises:

presenting a guidance control, the guidance control being used for triggering a guidance session between the virtual object and the non-user character, and the guidance session being used for guiding virtual tasks for the virtual object in the virtual scene; and receiving the interaction guidance instruction in response to a triggering operation for the guidance control.

20. The non-transitory computer-readable storage medium according to claim 17, wherein the receiving the interaction guidance instruction for the non-user character associated with the virtual object in the virtual scene comprises:

presenting a voice input control;

presenting collection indication information for indicating the conduction of voice collection in response to the triggering operation for the voice input control, and recognizing the content of the collected voice when the collection indication information indicates that the collection is completed; and receiving the interaction guidance instruction when the content of the voice contains target content associated with the non-user character.

\* \* \* \* \*